US011805750B2

(12) United States Patent
Dahl

(10) Patent No.: US 11,805,750 B2
(45) Date of Patent: Nov. 7, 2023

(54) VENT FOR LIVESTOCK STALL

(71) Applicant: Amity Technology, LLC, Fargo, ND (US)

(72) Inventor: Brian E. Dahl, Fargo, ND (US)

(73) Assignee: Amity Technology, LLC, Fargo, ND (US)

(*) Notice: Subject to any disclaimer, the term of this patent is extended or adjusted under 35 U.S.C. 154(b) by 687 days.

(21) Appl. No.: 17/007,288

(22) Filed: Aug. 31, 2020

(65) Prior Publication Data

US 2020/0396957 A1 Dec. 24, 2020

Related U.S. Application Data

(63) Continuation-in-part of application No. 15/491,421, filed on Apr. 19, 2017, now Pat. No. 10,757,908.

(60) Provisional application No. 62/324,729, filed on Apr. 19, 2016.

(51) Int. Cl.
*A01K 1/00* (2006.01)
*F24F 7/00* (2021.01)

(52) U.S. Cl.
CPC .......... *A01K 1/0064* (2013.01); *A01K 1/0011* (2013.01); *F24F 2007/004* (2013.01)

(58) Field of Classification Search
CPC .................. A01K 1/0064; F24F 2007/004
See application file for complete search history.

(56) References Cited

U.S. PATENT DOCUMENTS 5,312,467 A * 5/1994 Wolfe ............... B01D 39/1692
55/528
2017/0184334 A1 * 6/2017 Boehringer .......... F24F 13/084

* cited by examiner

Primary Examiner — Ko-Wei Lin
(74) Attorney, Agent, or Firm — Mai D. Lauer; Westman, Champlin & Koehler P.A

(57) ABSTRACT

An elongated vent includes a first piece and a second piece. The first piece has a first upper portion, a first middle portion and a first lower portion. The second piece is a mirror image of the first piece, the second piece having a second upper portion, a second middle portion and a second lower portion. The first and second pieces are joined together at their respective first and second middle portions, wherein each of the first and second middle portions includes a plurality of apertures therethrough, to form a perforated panel. The first and second upper portions form a first channel; the first and second lower portions form a second channel.

18 Claims, 38 Drawing Sheets

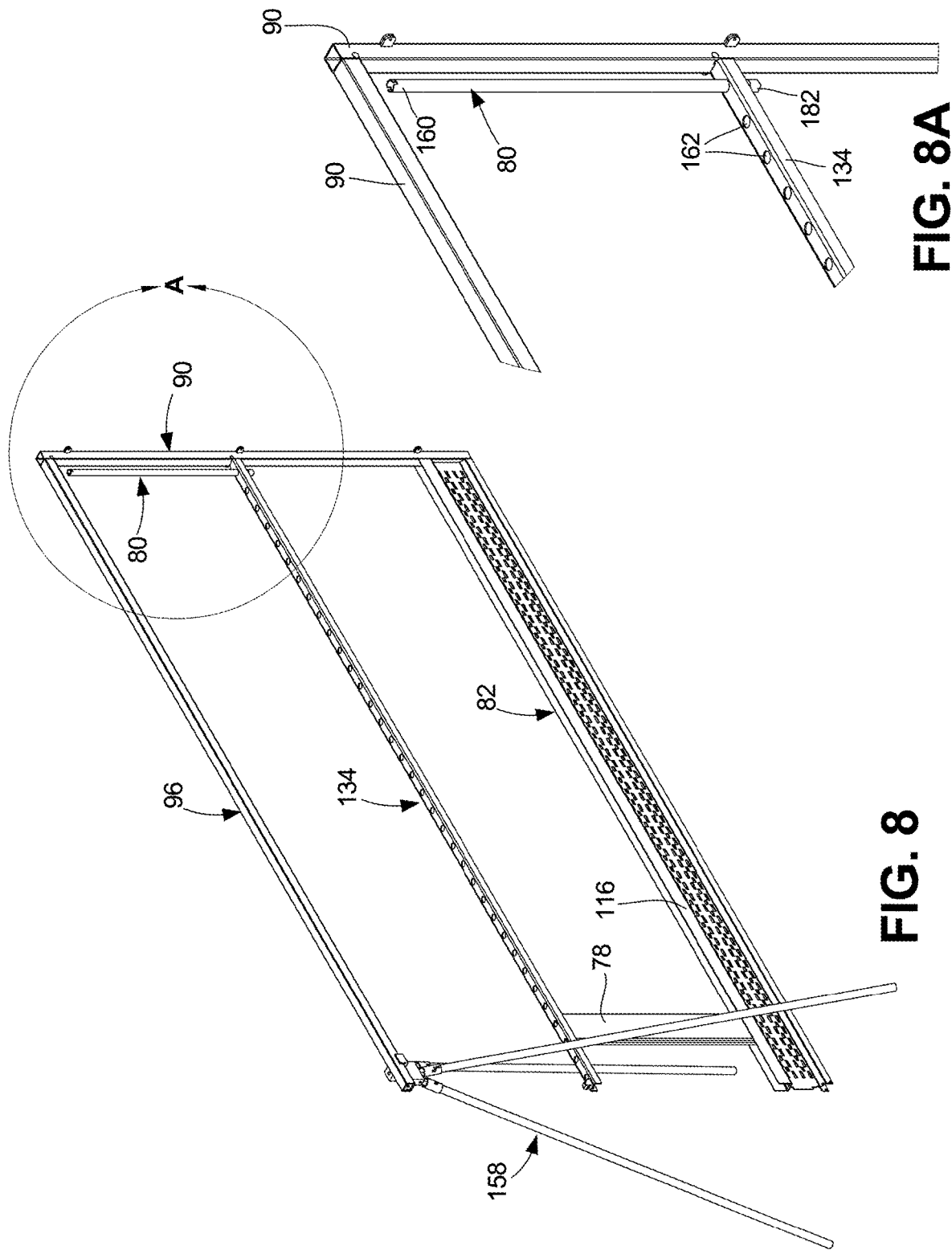

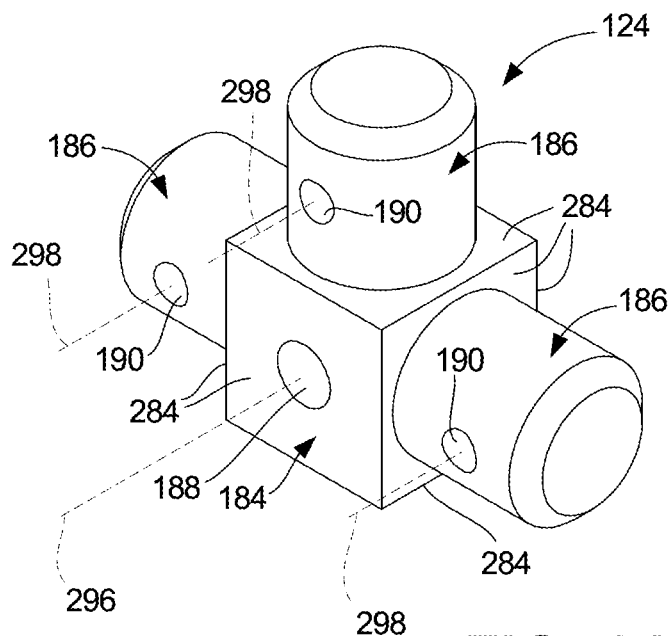
FIG. 14
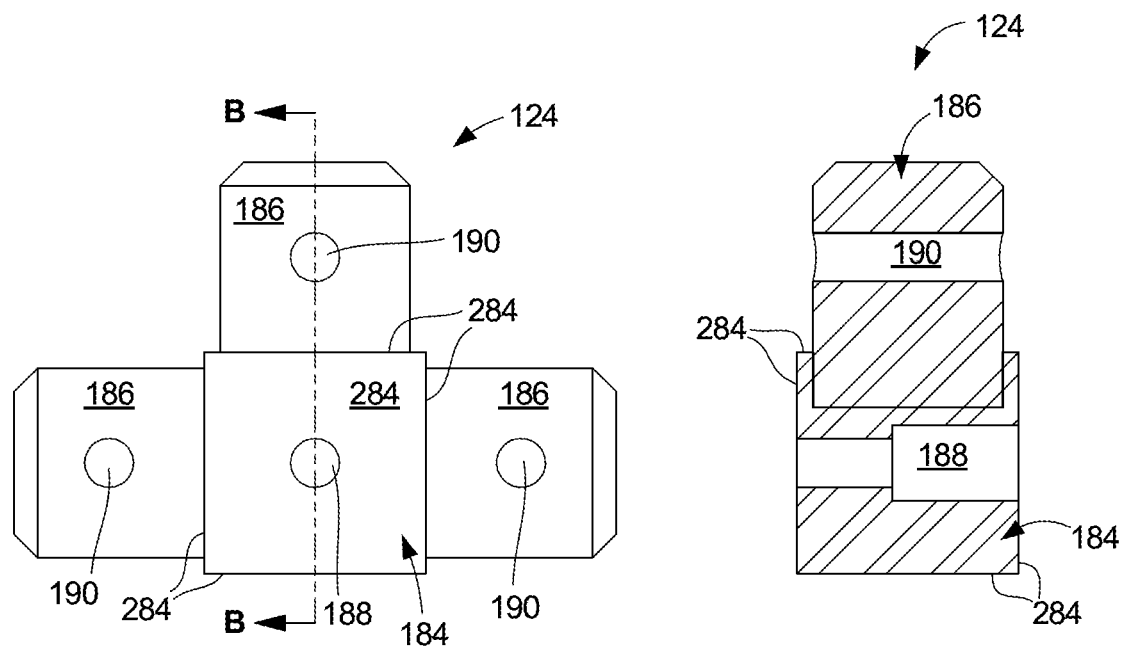
FIG. 14A  FIG. 14B

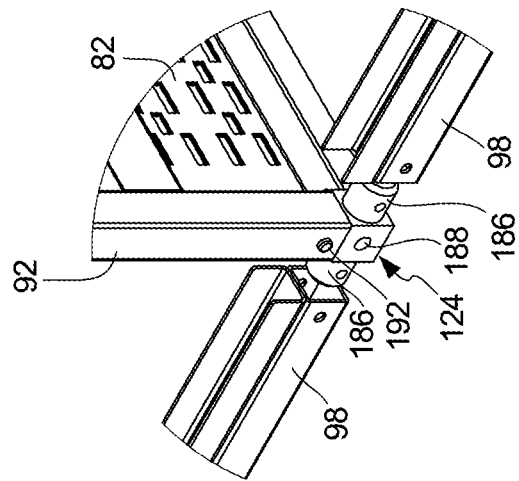
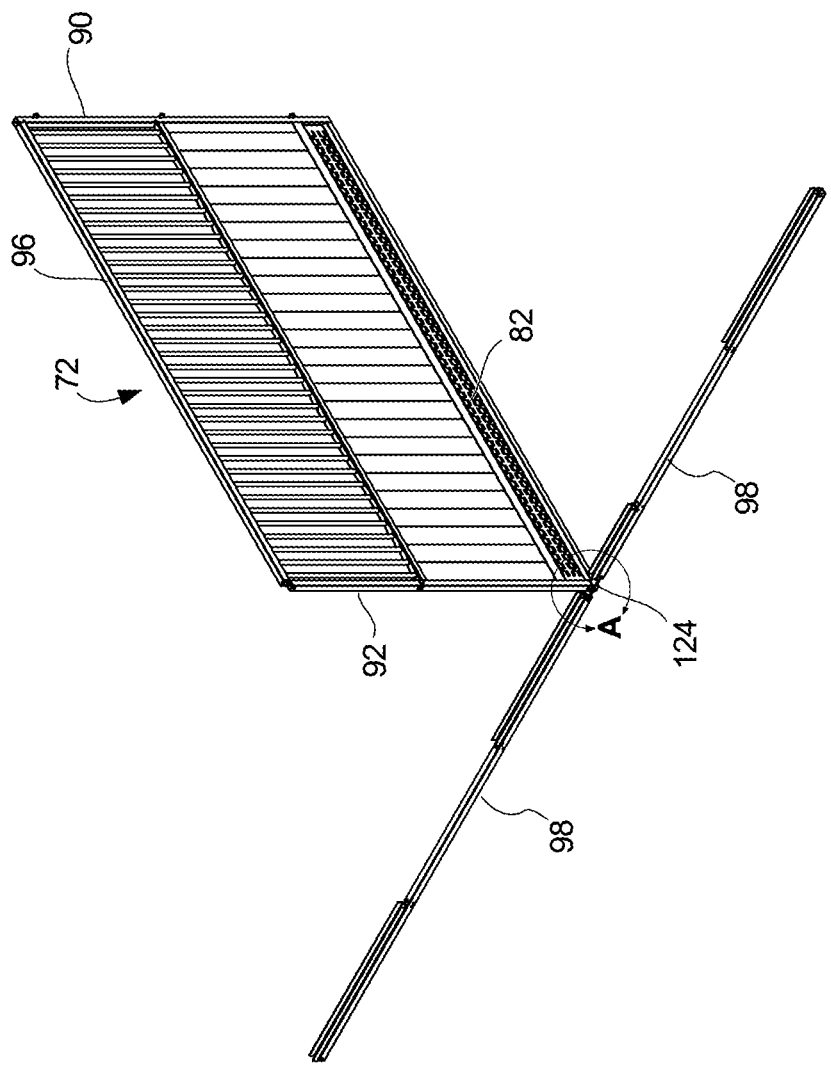

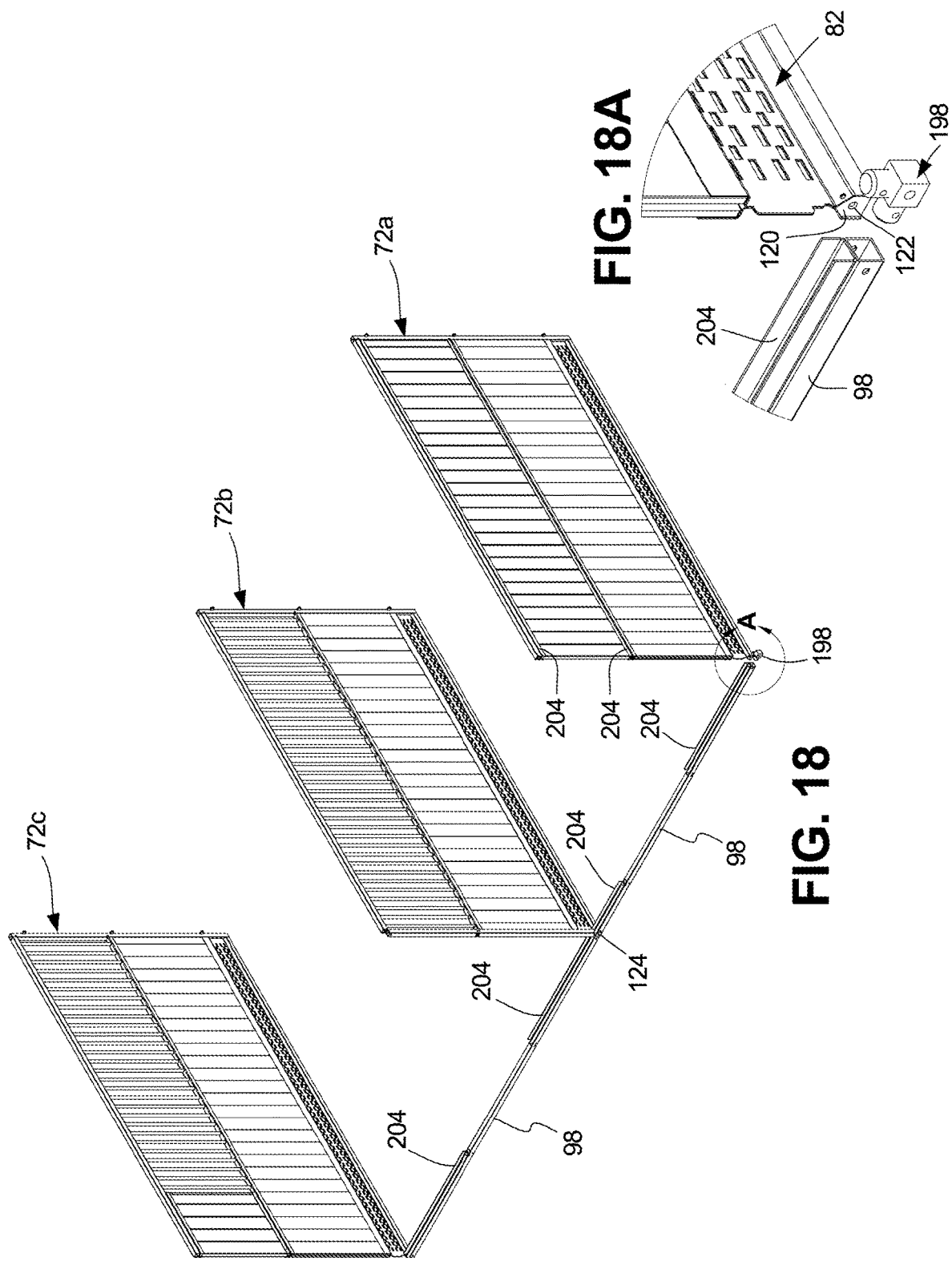

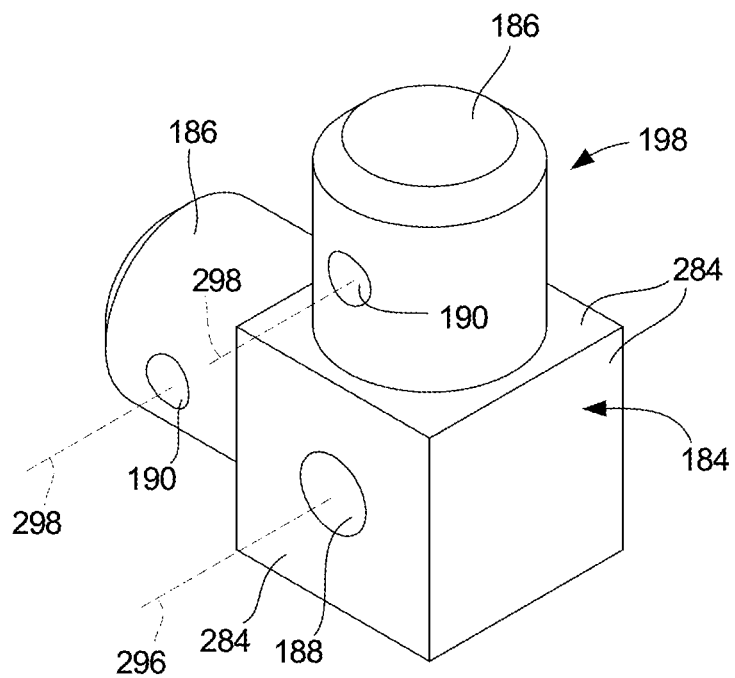
FIG. 19
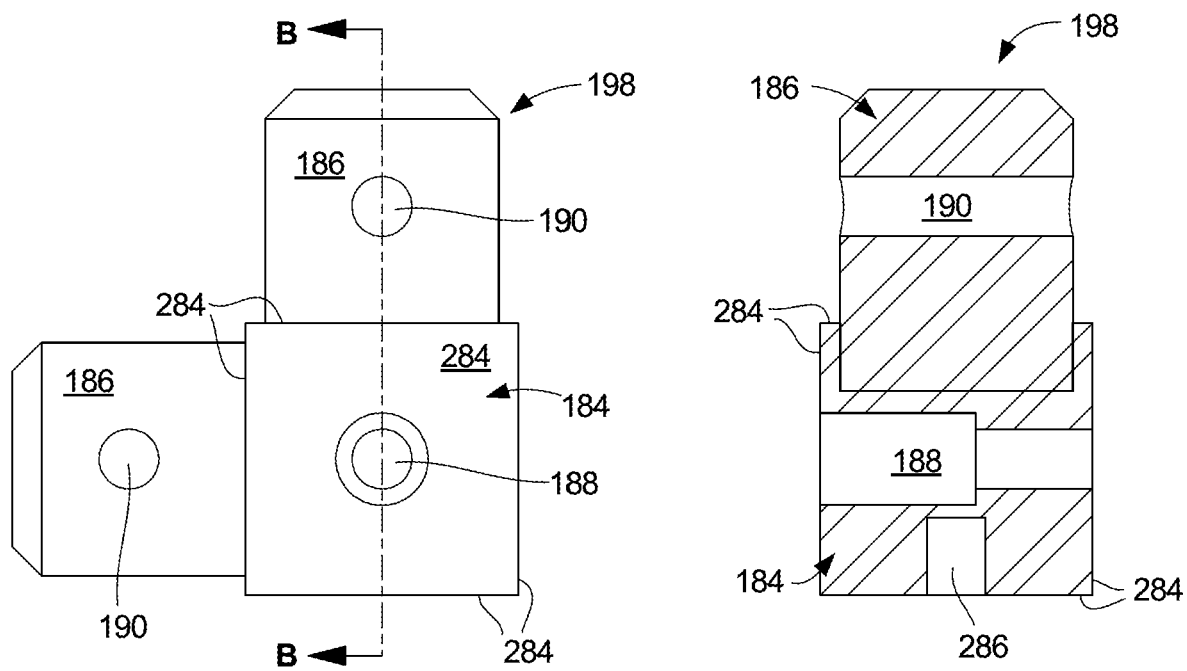
FIG. 19A  FIG. 19B

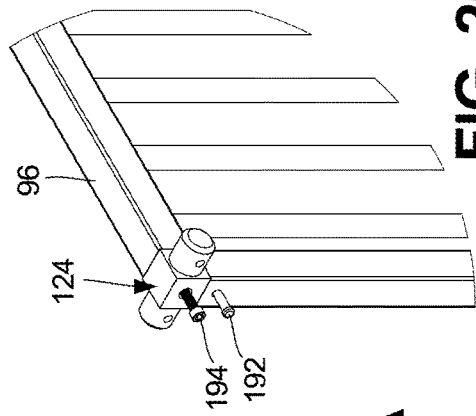
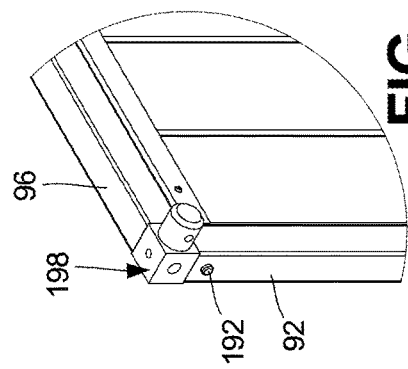
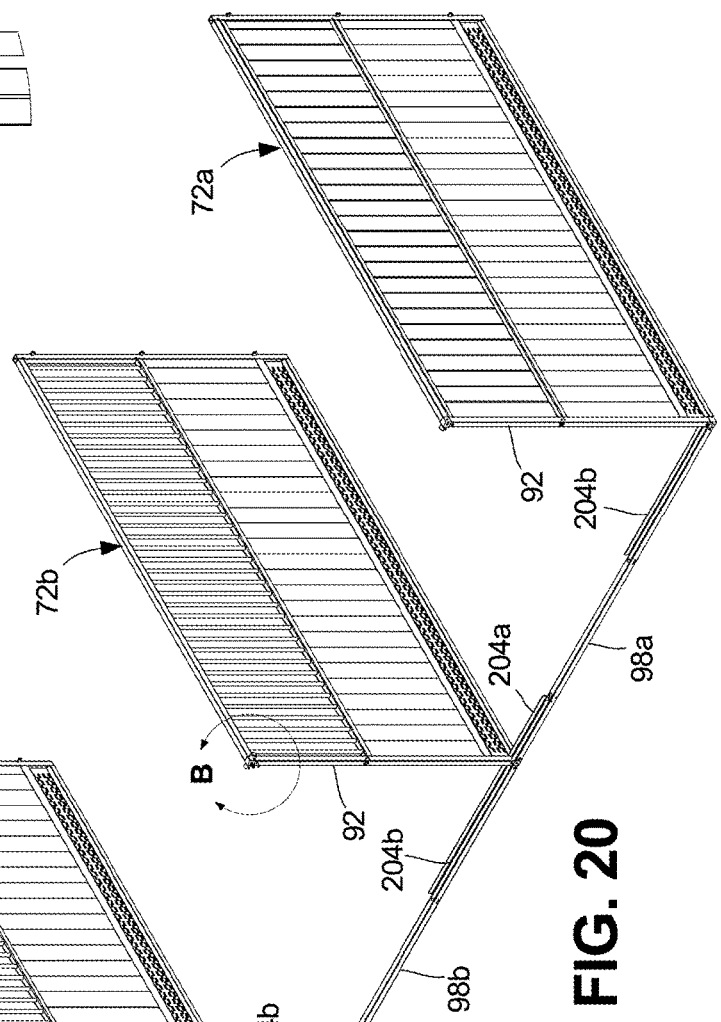
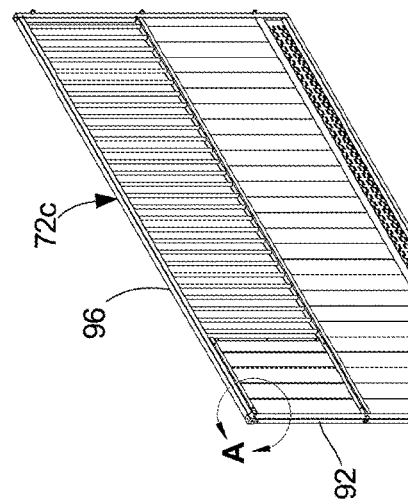

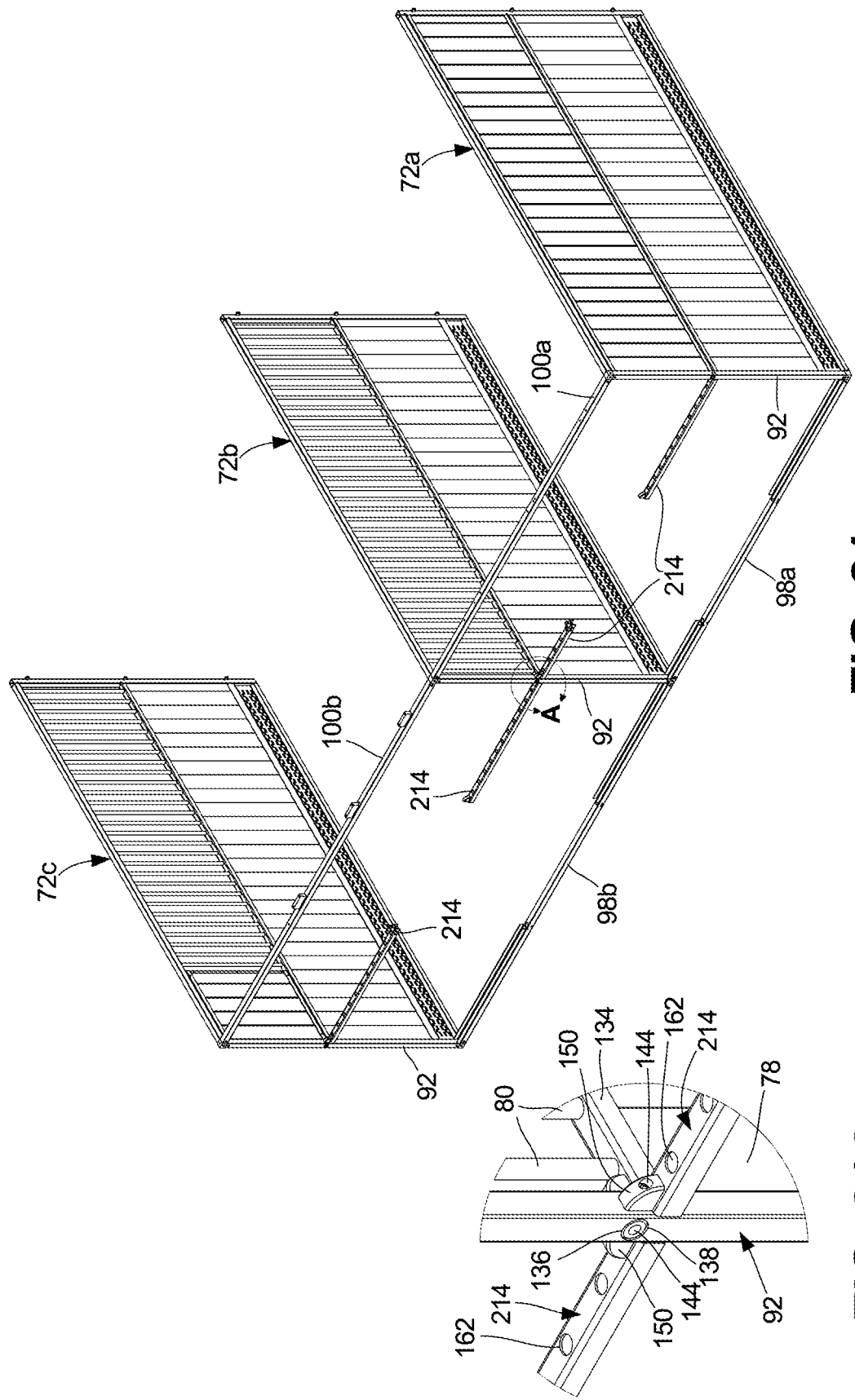

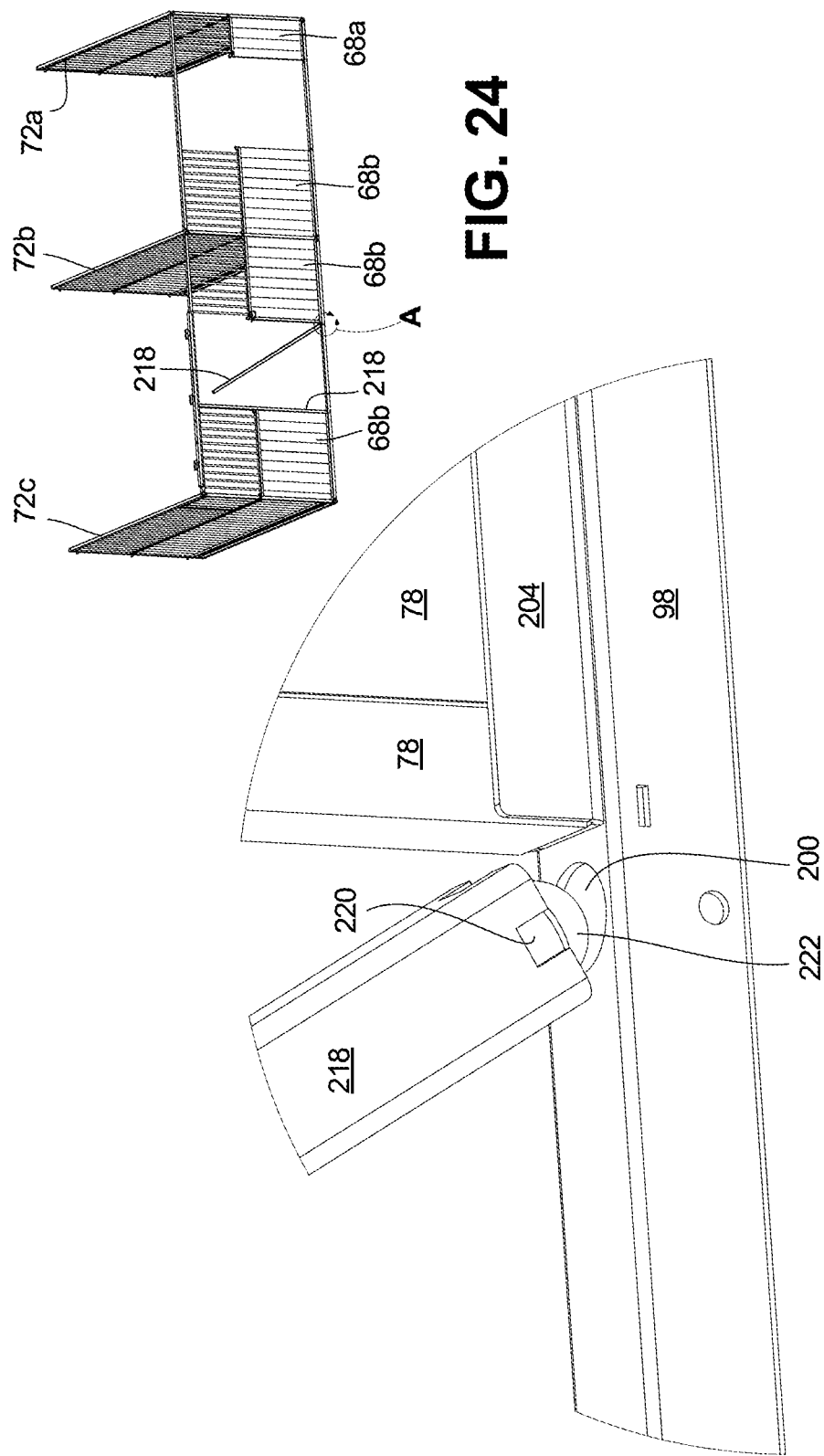

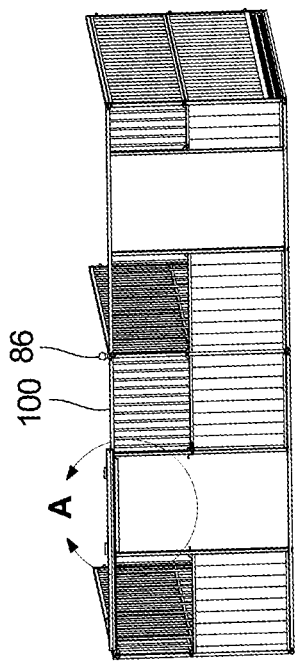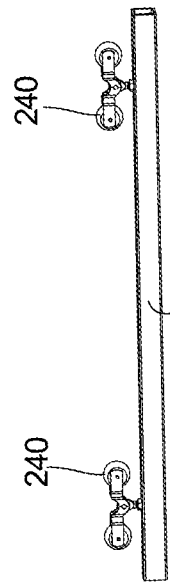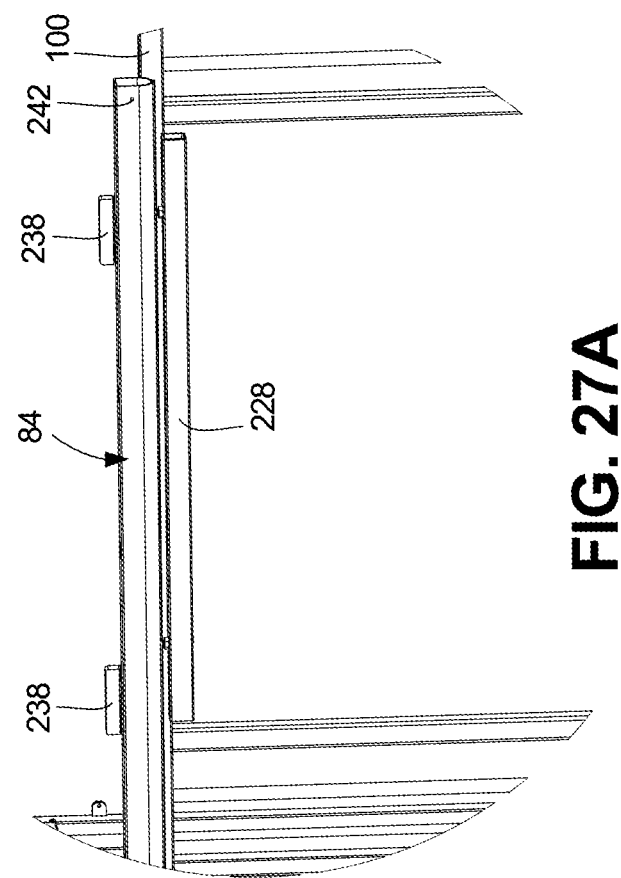

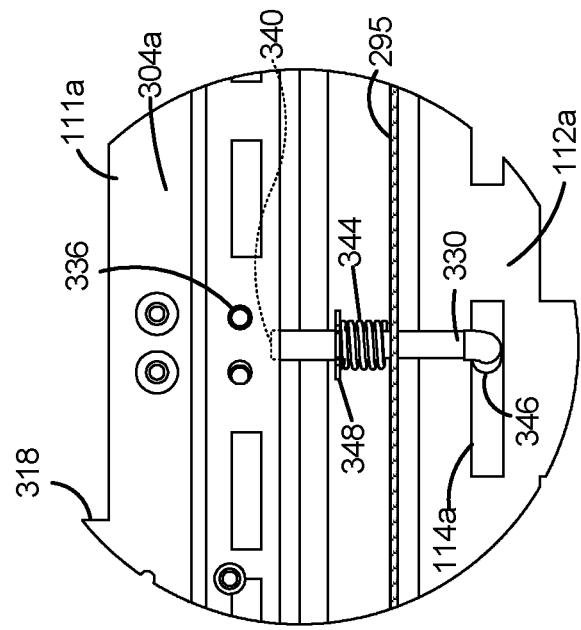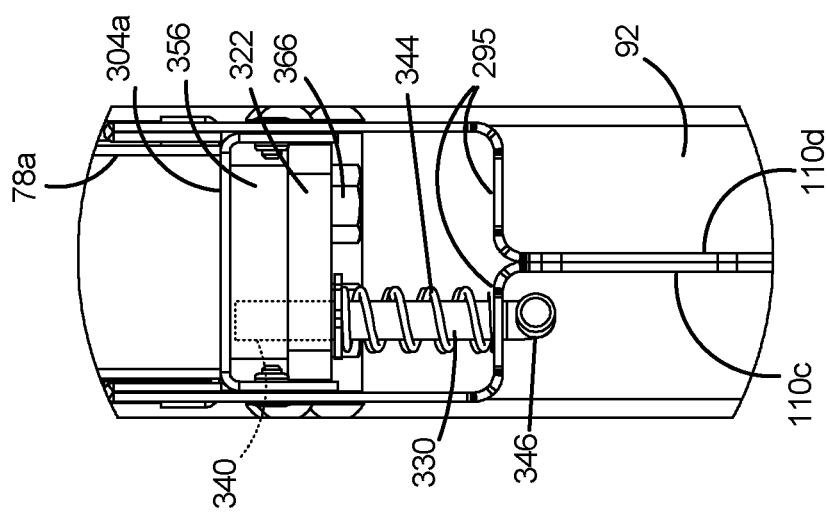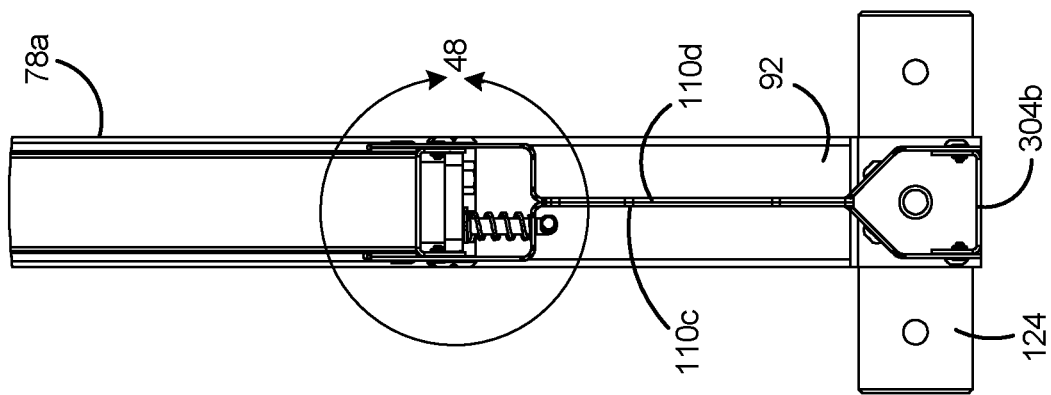

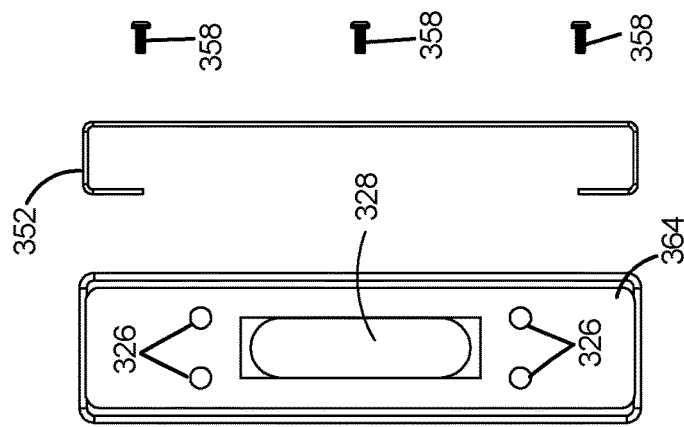
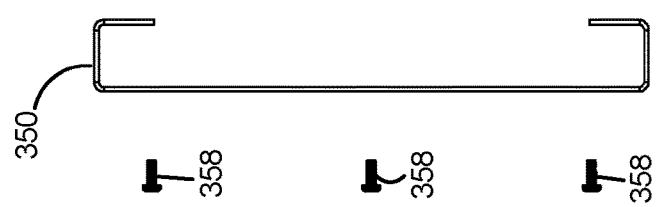
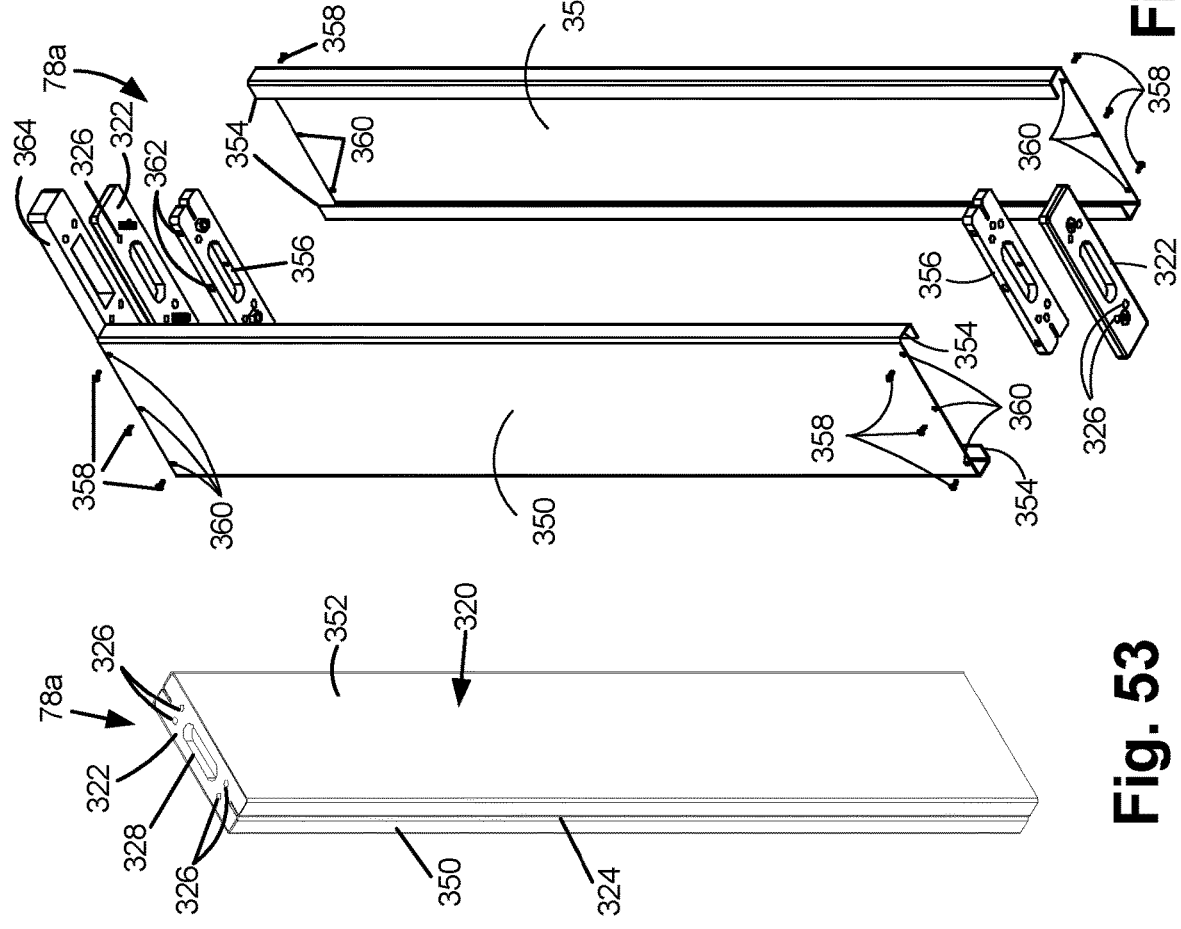
Fig. 55
Fig. 54
Fig. 53

VENT FOR LIVESTOCK STALL

CROSS-REFERENCE TO RELATED APPLICATIONS

This application is a continuation-in-part of U.S. patent application Ser. No. 15/491,421, filed Apr. 19, 2017, which claims the benefit of priority from U.S. Provisional Patent Application No. 62/324,729 filed Apr. 19, 2016; these priority applications are fully incorporated hereby by reference.

BACKGROUND

In a livestock building, individual stalls are commonly constructed to house a single animal or a small group of animals including, for example, a mother and her offspring. Such construction is usually an extensive undertaking, requiring a livestock manager to obtain materials, draw up plans, and hire a contractor to manage workers for a construction project. Commonly used construction methods require high levels of skill and coordination to build animal stalls from raw materials. Moreover, obtaining the needed materials from a variety of sources is often a complicated and time-consuming endeavor.

SUMMARY

In one aspect, this disclosure describes an elongated vent including a first piece and a second piece. The first piece has a first upper portion, a first middle portion and a first lower portion. The second piece is a mirror image of the first piece, the second piece having a second upper portion, a second middle portion and a second lower portion. The first and second pieces are joined together at their respective first and second middle portions, wherein each of the first and second middle portions includes a plurality of apertures therethrough, to form a perforated panel. The first and second upper portions form a first channel; the first and second lower portions form a second channel.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 4A is an enlarged view of the encircled end portion "A" of FIG. 4.

FIG. 4B is an enlarged view of the encircled end portion "B" of FIG. 4.

FIG. 5A is an enlarged view of the encircled portion of FIG. 5.

FIG. 6A is an enlarged view of the encircled portion of FIG. 6.

FIG. 8 is a perspective view of the components of FIG. 7 in a connected configuration, and with a grill tube inserted through the side wall channel and positioned for connection to the top side wall tube.

FIG. 8A is an enlarged view of the encircled portion of FIG. 8.

FIG. 13A is an enlarged view of the encircled portion of FIG. 13.

FIG. 14 is a perspective view of an exemplary four-way connector.

FIG. 14A is a side elevation view of the four-way connector of FIG. 14.

FIG. 14B is a cross-sectional view of the four-way connector, taken along line B-B of FIG. 14A.

FIG. 15 is a perspective view showing two front floor tubes and front upright support tube connected to the four-way connector of FIG. 13.

FIG. 15A is an enlarged view of the encircled portion of FIG. 15.

FIG. 18 shows the use of a three-way connector with the vent element and a front floor tube.

FIG. 18A is an enlarged view of the encircled portion of FIG. 18.

FIG. 19 is a perspective view of an exemplary three-way connector.

FIG. 19A is a side elevation view of the three-way connector of FIG. 19.

FIG. 19B is a cross-sectional view of the three-way connector, taken along line B-B of FIG. 19A.

FIG. 20 is a perspective view showing front upright support tubes connected to respective top side wall tubes by three-way and four-way connectors.

FIG. 20A is an enlarged view of the encircled portion "A" of FIG. 20.

FIG. 20B is an enlarged view of the encircled portion "B" of FIG. 20.

FIG. 21 is a perspective view showing front upright support tubes connected to front channels by boss and bracket assemblies.

FIG. 21A is an enlarged view of the encircled portion of FIG. 21.

FIG. 24 is a front perspective view showing installation of a door jamb to the first front wall portion.

FIG. 24A is an enlarged view of the encircled portion of FIG. 24.

FIG. 27 shows insertion of a trolley of a door top frame into the door track.

FIG. 27A is an enlarged view of the encircled portion of FIG. 27.

FIG. 27B shows the trolley removed from the door track.

FIG. 40 shows a grilled window cover that can be custom fit to an existing window opening.

FIG. 47 is an end elevation view of a bottom portion of a wall as shown in FIG. 48.

FIG. 48 is an enlarged view of the circled portion of FIG. 47 labeled "48."

FIG. 49 is a side elevation view of approximately the portion of the wall assembly of FIG. 48, with the locking shaft pulled downward.

FIG. 53 is a perspective view of a second exemplary embodiment of a wall board.

FIG. 54 is an exploded view of the components of the wall board of FIG. 53.

FIG. 55 is an exploded top end view of the components of the wall board of FIG. 53.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure describes modular components that can be assembled from various construction kits to allow for easy and quick construction of livestock stalls. The described elements are measured and machined to fit precisely together, thereby eliminating many labor-intensive steps in a stall construction process. Moreover, essential materials for the construction process are provided, thereby simplifying a materials procurement process for stall construction. The completed stall assemblies are durable enough to withstand many years of use with large animals. However, each of the elements for construction is designed to have a light enough weight (e.g., under about 60 pounds) and compact enough form that it can be comfortably handled by just one or two people. As shown in the attached drawing figures, the construction process can be accomplished easily by two people, or by one person with the aid of a support element such as a scaffold or stand as shown in FIG. 8, for example.

Figure 1:
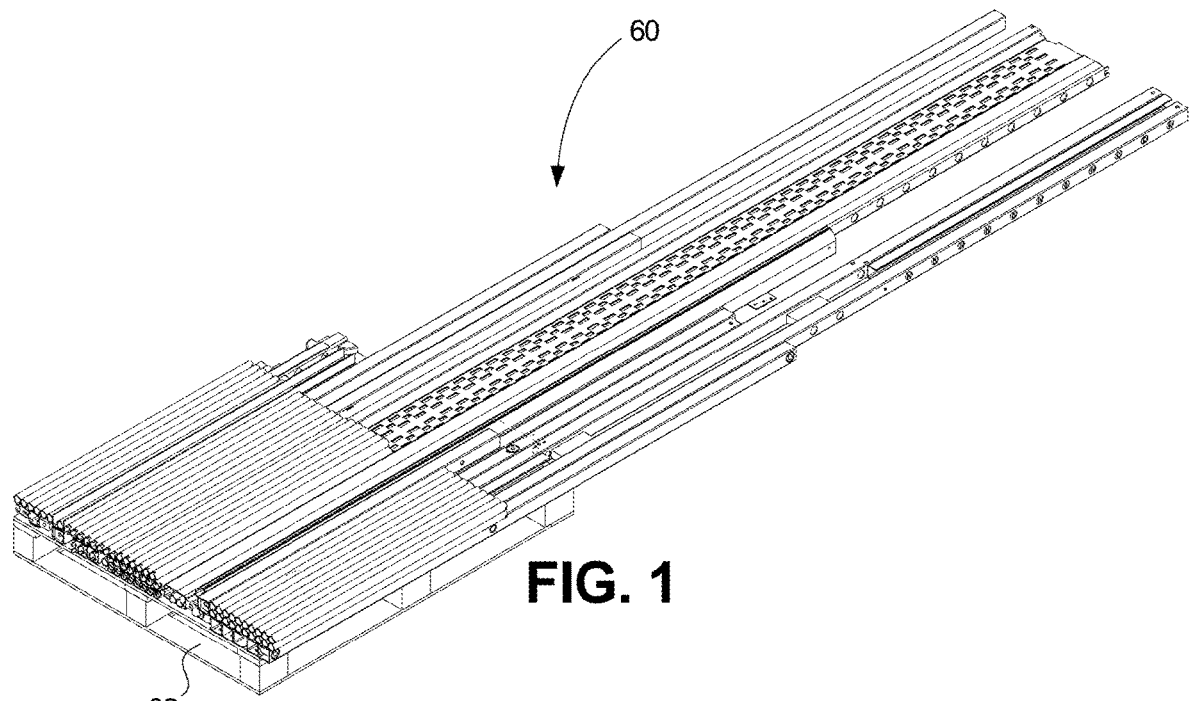
FIG. 1 is a perspective view of an exemplary kit of the present disclosure for constructing a livestock stall or portion thereof.
Figure 2:
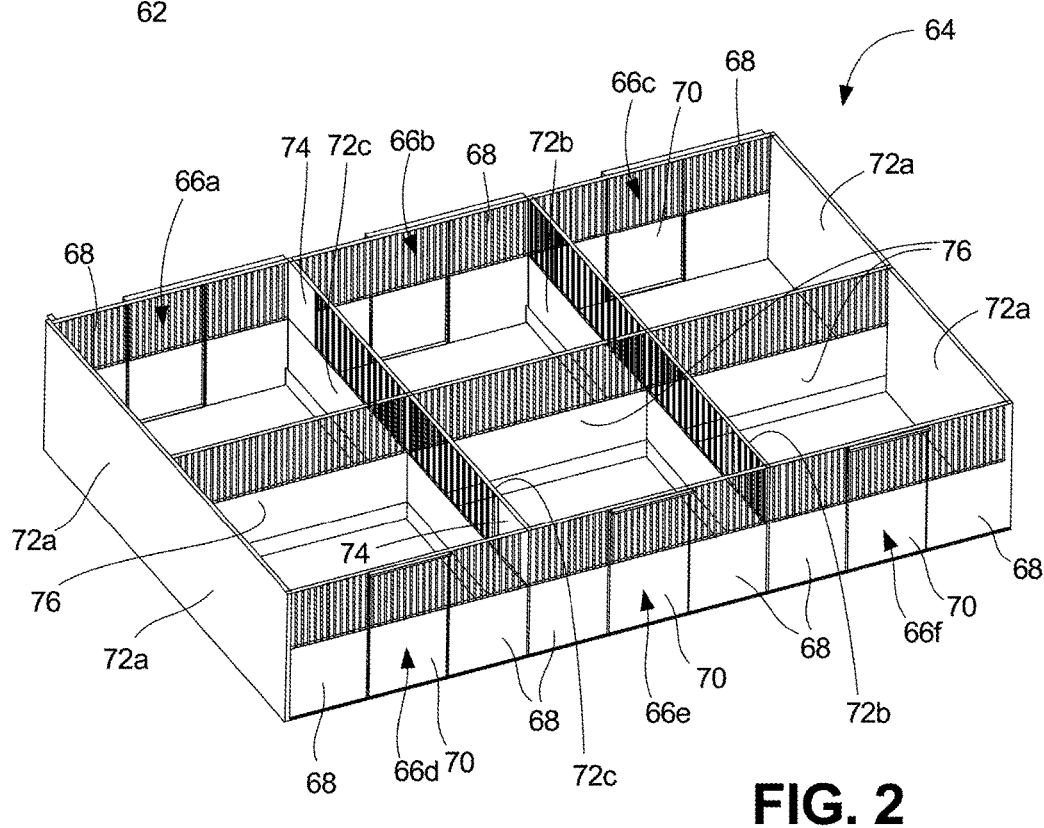
FIG. 2 is a top perspective view of a plurality of connected modular livestock stalls.

The present disclosure describes a kit including elements for the modular construction of livestock stall assemblies. As shown in FIG. 1, an exemplary kit 60 can be arranged on a pallet 62 for ease of transportation and storage. As shown in FIG. 2, a plurality of kits 60 can be used to construct an arrangement 64 of individual livestock stalls 66. In an exemplary embodiment, an individual stall is about 12 feet wide, about 12 feet deep, and about 7 feet high. However, other sizes are also suitable. In the illustrated embodiment, arrangement 64 includes six individual stalls 66a through 66f. In the illustrated arrangement 64, three stalls 66a through 66c face in a first direction (i.e., their doors 70 are all on the same side of arrangement 64) and are adjacent back-to-back to three stalls 66d through 66f that face a second direction. Thus, the arrangement 64 can be installed in a central area of a livestock building. In the illustrated arrangement 64, each of the stalls 66a through 66f includes a front wall 68 having door 70. Some side walls 72b, 72c are shared between two stalls 66, while other side walls 72a are not shared between stalls 66. Some of the side walls 72c may have a privacy wall feature 74, while other side walls 72a, 72b do not. Such a privacy wall feature 74 is especially useful in stalls for housing animals that feed better when they are not in view of animals in neighboring stalls. In an exemplary construction of arrangement 64, such a privacy wall feature 74 would be located at a corner of a stall 66 in which a feed bucket or other feed station is positioned.

In the illustrated embodiment, side walls 72a are substantially solid. In contrast, side walls 72b, which can be placed between neighboring stalls 66, in some embodiments have a substantially open top portion that allows for the passage of light and air. Yet other side walls 72c, which can be positioned between neighboring stalls, have a top portion that is generally open, as well as a privacy wall feature 74. It is contemplated that any type of side wall 72 may be located on any side of any stall 66 in any desired arrangement of stalls. Moreover, stall walls and doors having other combinations of features that are not explicitly shown may also be used. Many other combinations of disclosed elements can be devised following the teachings of this disclosure.

In an exemplary embodiment, each of front walls 68, including door 70, also has a substantially open top portion.

In an exemplary arrangement 64, two stalls that face in opposite directions share a back wall 76 that also includes a substantially open top portion in an exemplary embodiment and can be constructed similarly to side wall 72b. However, it is contemplated that back wall 76 can be substantially solid, similar to the illustrated walls 72a, or partially solid, as with walls 72c.

Figure 3:
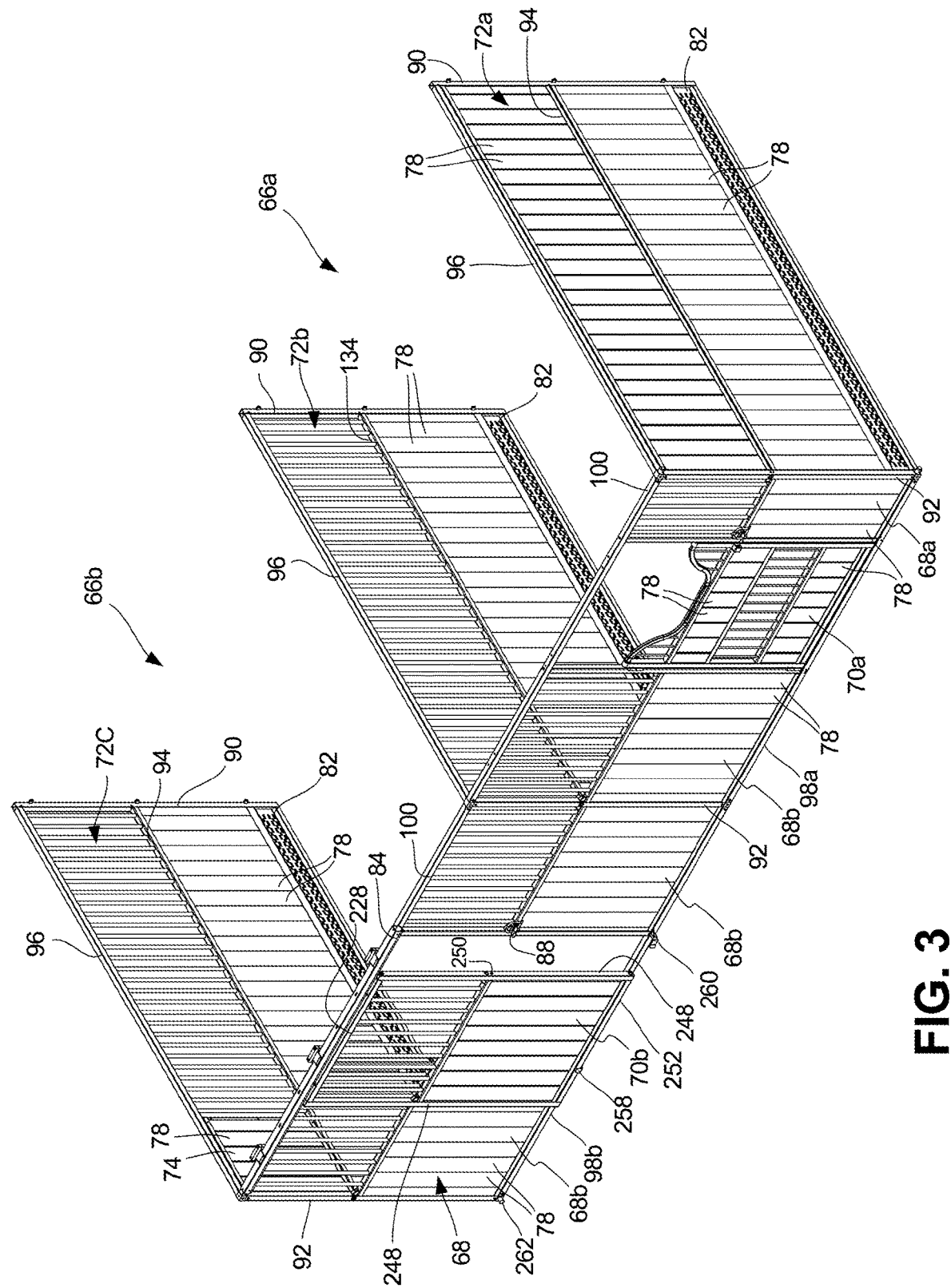
FIG. 3 is a perspective view of two exemplary constructed livestock stalls of the present disclosure.

FIG. 3 is a perspective view of an assembly of two exemplary stalls 66a and 66b. Stalls 66 need not be installed in a freestanding arrangement, as shown in arrangement 64 of FIG. 2. Rather, side walls 72 and front wall 68 can be installed against an existing wall of a building (such as wall 104 shown in FIG. 40), which then serves as the back wall of the stall 66. In the illustrated embodiment, the stalls 66a and 66b are configured to abut an existing wall of the building, so that no modular back wall 76 is required. The two stalls 66a and 66b show some variations illustrating the modularity and customization available using the described components. It is to be understood that the described components can also be combined in other ways to meet the needs of a particular user and building. For example, in stall 66a, wall 72a is substantially solid; front wall 68 includes a swinging gate 70a; and wall 72b, shared with stall 66b, has a substantially open top section. For stall 66b, front wall 68 includes a sliding door 70b and side wall 72c includes privacy wall 74 on a portion of the top section. Stall 66b is larger than stall 66a; in the illustrated embodiment, 66b uses two wider front wall sections 68b, while stall 66a uses one wider front wall section 68b and one narrower front wall section 68a.

In an exemplary embodiment, at least a portion of front wall 68, gate or door 70, and side walls 72 is substantially solid and is constructed from a plurality of boards 78. In contrast, the generally open top portions of front wall 68, gate or door 70, and side walls 72 includes grill tubes 80. In an exemplary embodiment, each of boards 78 includes a tongue on one side edge and a groove on the opposite side edge, so that adjacent boards fit together in a known manner. Privacy wall feature 74 may also include such boards 78. Moreover, while grill tubes 80 are described as having a substantially cylindrical tubular shape in one embodiment, it is contemplated that the substantially open top portions of the walls of a livestock stall may include those with substantially square cross sections and other elements that are not tubes. For example, other generally open structures may include a grid, screen or mesh configuration. In an exemplary embodiment, some or all of front wall 68, side wall 72 and back wall 76 may include a vent element 82 on a lower portion of the respective wall.

In an exemplary embodiment of stall 66a, gate 70a is a swinging door that is pivotally attached by hinges to a door jamb 218 (shown in more detail in FIGS. 24, 24A and 39-39B). In an exemplary embodiment of stall 66b, door 70b is a sliding door that is slidably received within door track 84 to hang therefrom. Accordingly, very little clearance space is required on an interior or exterior side of door 70b for its operation. It is contemplated that any style of door 70a may be used for any particular stall 66. Moreover, in some cases, it may be desirable to omit a door and merely leave an open door wall between front wall sections 68a, 68b. Moreover, decorative elements such as finials 86 (shown in FIG. 26) may be provided on stall 66.

In an exemplary embodiment, each of side walls 72 is connected to rear upright support 90 and front upright support 92. Spanning a distance between rear upright support 90 and front upright support 92 are vent element 82, side channels 94, 134 and side top tube 96. Spanning a distance between the two front upright supports 92 are front floor tube 98 and front top tube 100. While frame members of an exemplary stall 66 are described generally as tubes, it is contemplated that other elongated structural members can be used, such as rods, channels, and angle iron pieces, for example.

Returning to FIG. 1, in an exemplary kit 60, elements are included for the construction of front wall 68, gate/door 70, and just a single side wall 72. These components are sufficient for installation of a stall 66 in a corner of an existing building. Additionally, only these components would be required to build a second adjacent stall, in a case where a first stall has already been completed, and wherein the first and second stalls would share a common side wall 72. Moreover, in an exemplary embodiment, kit 60 does not include boards 78, which are readily obtainable through sources such as lumberyards. Such a configuration of kit 60 allows the weight of kit 60 to be about 625 pounds and allows kit 60 to have a compact form. For example, in an exemplary embodiment, it is possible to fit about sixty-four kits 60 in a semi-trailer container that is about 50 feet long. It is contemplated that other kits can be designed to provide the elements required for construction of entire stalls 66 or portions thereof, including variations on the type of side wall, back wall, front wall, or door/gate. Optional accessory kits can also be provided including parts such as finials 86, for example. Moreover, a stall construction kit can be customized for a particular customer, in accordance with the customer's specific request.

Figure 4:
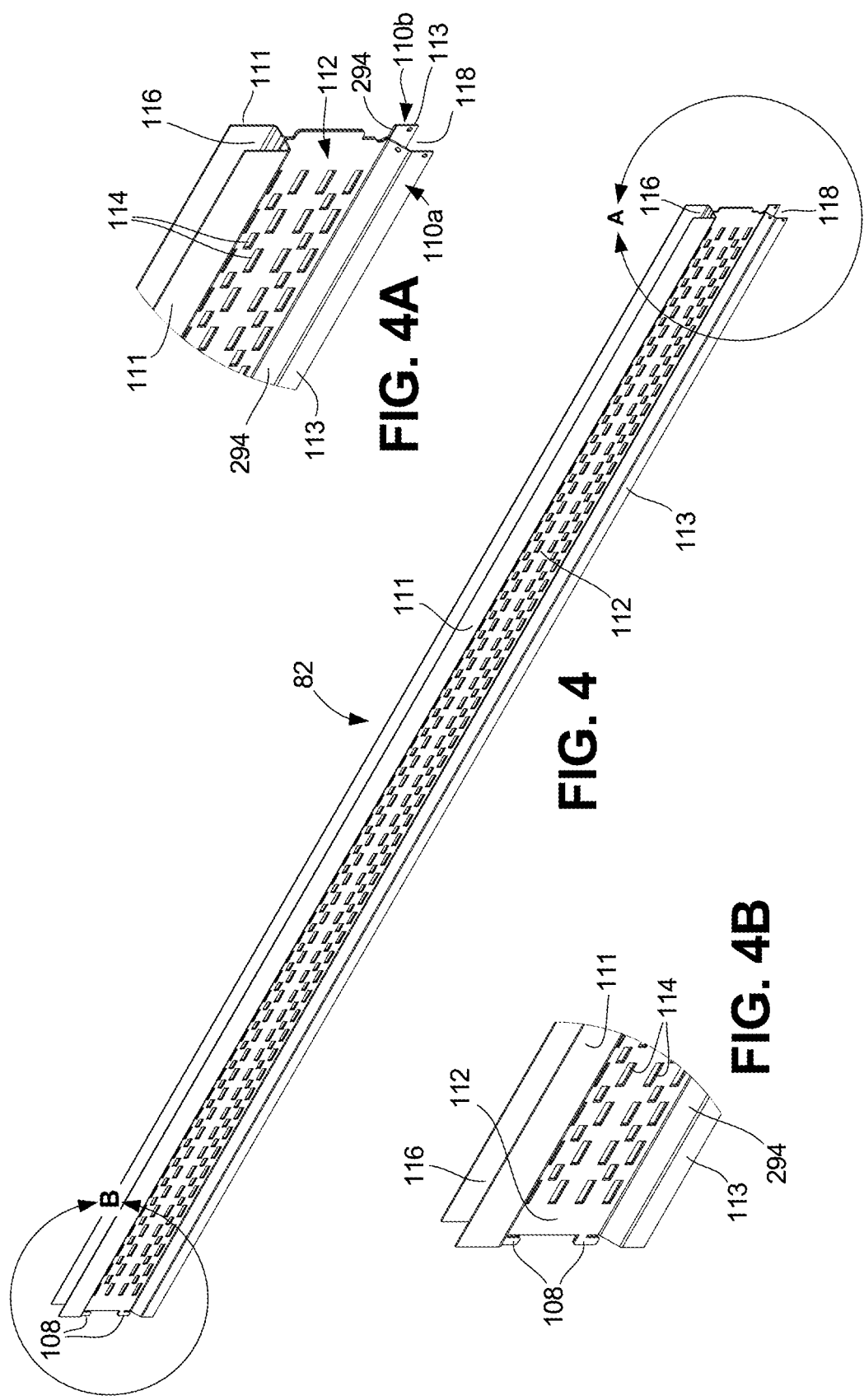
FIG. 4 is a perspective view of an exemplary vent element.

FIG. 4 is a perspective view of an exemplary vent element 82. FIG. 4A is an enlarged view of the encircled end portion "A" of FIG. 4. FIG. 4B is an enlarged view of the encircled end portion "B" of FIG. 4. In an exemplary embodiment, vent element 82 is formed from two bent and stamped sheet pieces 110a and 110b that are formed, such as from stainless steel, as mirror images of each other. Each of pieces 110a, 110b includes upper portion 111, middle portion 112, and lower portion 113. Pieces 110a, 110b are secured together at middle portion 112. Each sheet metal piece 110a, 110b includes apertures 114 through middle portion 112 to allow for air flow through vent element 82, thereby providing a perforated panel at middle portion 112. While apertures 114 are illustrated as elongated slots in an exemplary embodiment, it is contemplated that an arrangement of apertures 114 can have another configuration, such as substantially square apertures in a grid formation, for example. Moreover, the slots may be arranged vertically rather than horizontally. Many other configurations for allowing air flow through a middle portion 112 of vent element 82 are also suitable including, for example, apertures having circular, semicircular, elliptical shapes and specialty shapes, such as the outlines of horses or leaves for example. In an exemplary embodiment, a combined area of the plurality of apertures 114 includes at least about 25% of an area of the middle portion 112, up to about 50% of an area of the middle portion 112. It is contemplated that other ranges are also possible, taking into consideration strength properties of the materials and construction of vent element 82.

In an exemplary embodiment, the two sheet metal pieces 110a, 110b are attached together at middle portion 112 by lamination, including the use of adhesive and pressure. It is contemplated that other attachment methods can also or alternatively be used, such as the use of mechanical fasteners and welding, for example. An exemplary vent element 82 includes an open upper channel 116 formed by upper portions 111 of pieces 110a, 110b and an open lower channel 118 formed by lower portions 113 of pieces 110a, 110b.

Upper channel 116 is configured to accept boards 78, as shown in FIGS. 3 and 8. Lower portions 113 of lower channel 118 include angled side walls 294 (i.e., angled from middle portions 112) to allow fluid and debris to flow or fall off by gravity. In an exemplary embodiment, one end of lower channel 118 is closed by end wall 120 (shown in FIG. 18A), which is welded into channel 118 and includes an aperture 122. As shown in FIG. 18A, aperture 122 of end wall 120 is provided to accept a fastener for connection to a connector, which is also attached to front upright support 92. Especially when installing vent element 82 on a floor that may be uneven, such as a dirt floor, for example, channel 118 can be substantially filled by a wooden beam (not shown), for example, to provide additional structural support to keep vent element 82 level on an uneven floor surface. Such a beam would also prevent warping and bending of the fins of lower portions 113. In an exemplary embodiment, such a beam can be formed by ripping down a 2×4 piece of treated lumber to fit into channel 118.

Figure 5:
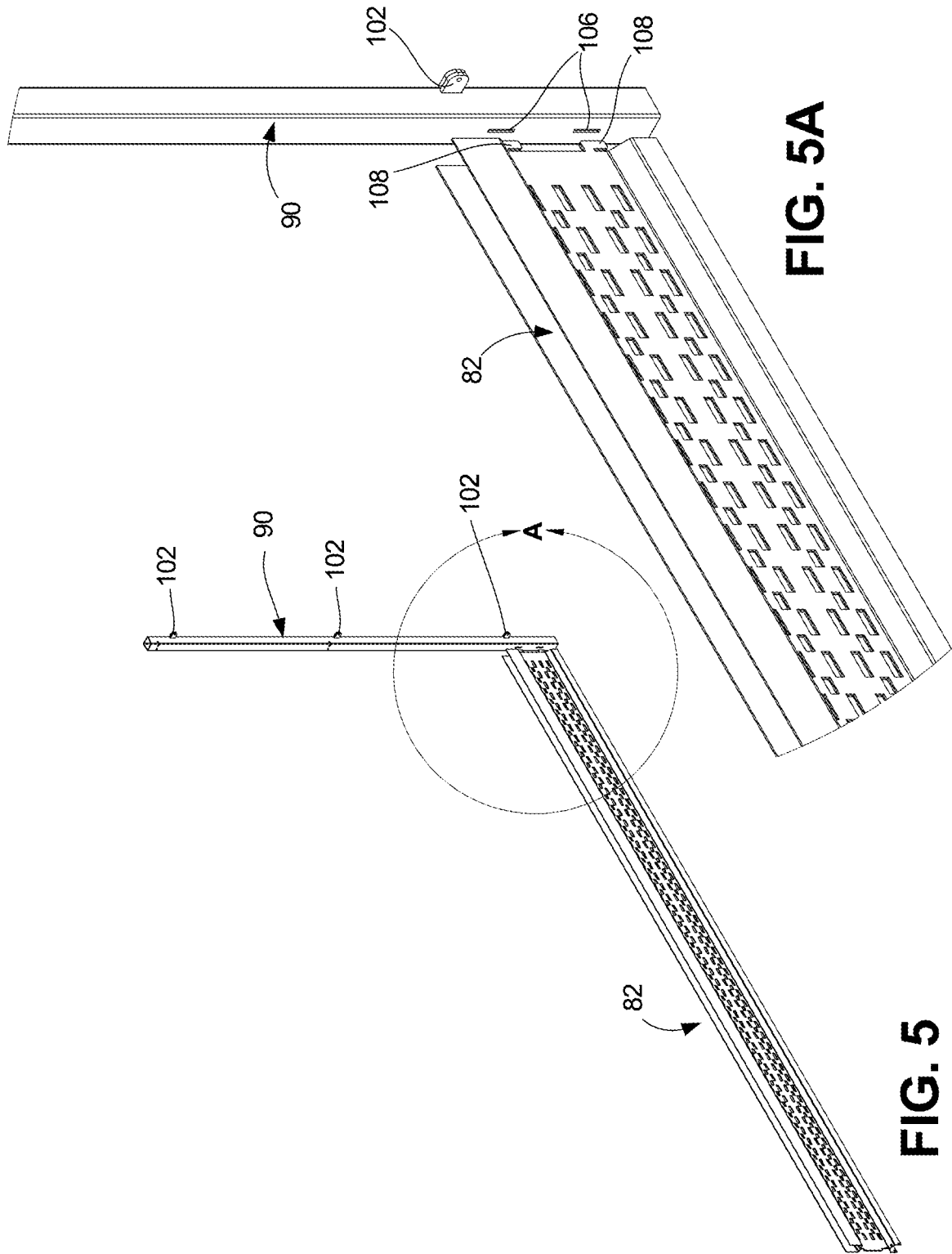
FIG. 5 is a perspective view of an upright support and a lower vent element positioned for mutual connection.

FIGS. 5 and 5A shown rear upright support 90 and lower vent element 82 positioned for mutual connection. Rear upright support 90 has tabs 102 for connection to an existing wall (such as wall 104 shown in FIG. 40) of a livestock building. In a case where a livestock stall 66 does not have its own back wall 76 but rather is attached to an existing wall of a livestock building, rear upright support 90 can be attached to the wall by securing fasteners through tabs 102 of rear upright support 90 and into the wall. Known suitable fasteners include bolts, screws, nails and others. In an exemplary embodiment, tabs 102 are welded to rear upright support 90 at discreet intervals. In an exemplary embodiment, a bottom portion of rear upright support 90 includes slots 106 for the receipt of hooks 108 provided on one end of vent element 82. While tabs 102 are shown as being fixed to support 90, it is also contemplated that similar tabs may be provided on a bracket that removably wraps around support 90.

Figure 6:
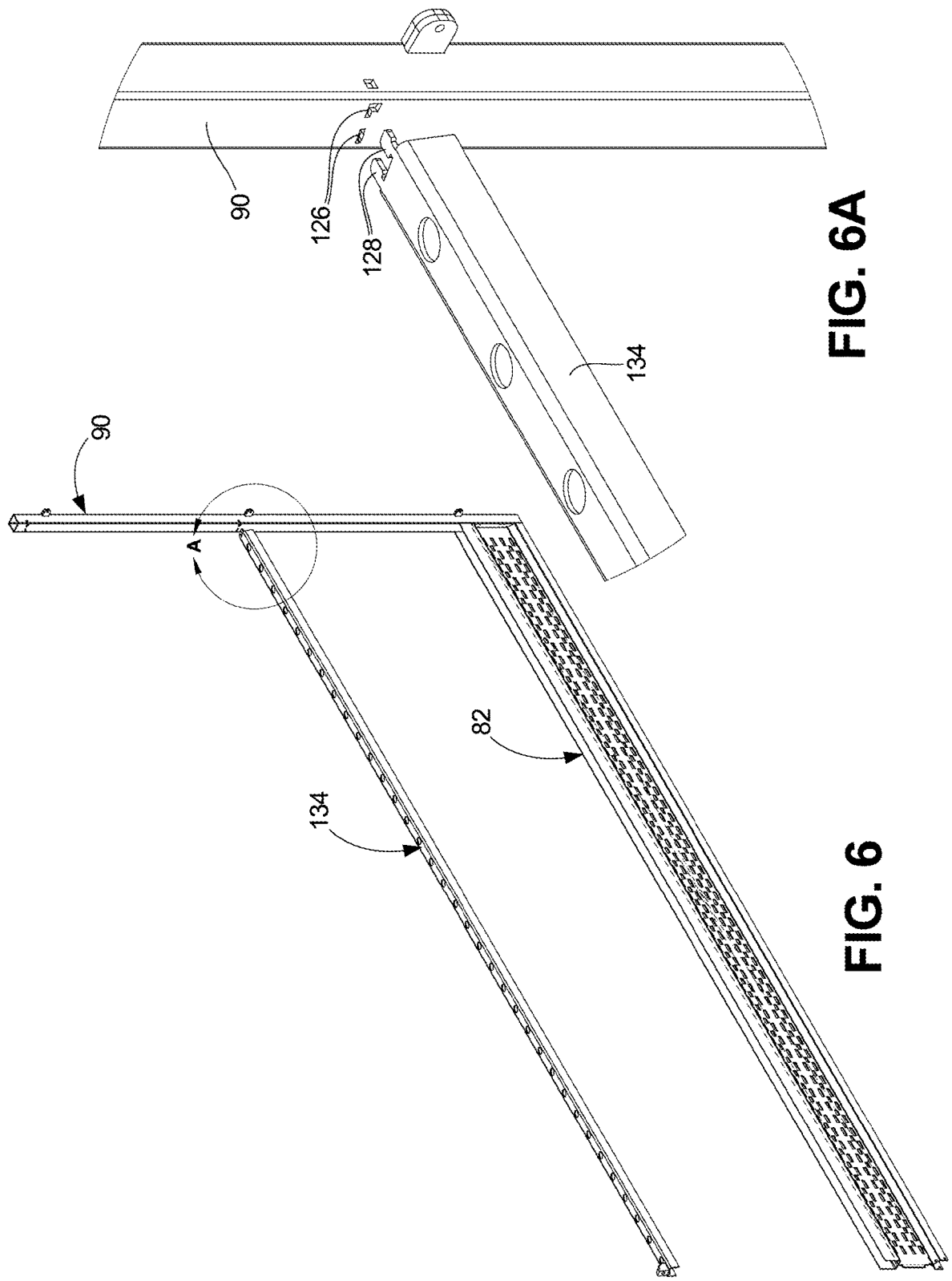
FIG. 6 is a perspective view of the rear support tube and vent element of FIG. 5 in a connected configuration, and with a side wall channel positioned for connection to the rear support tube.
Figures 7, 7A:
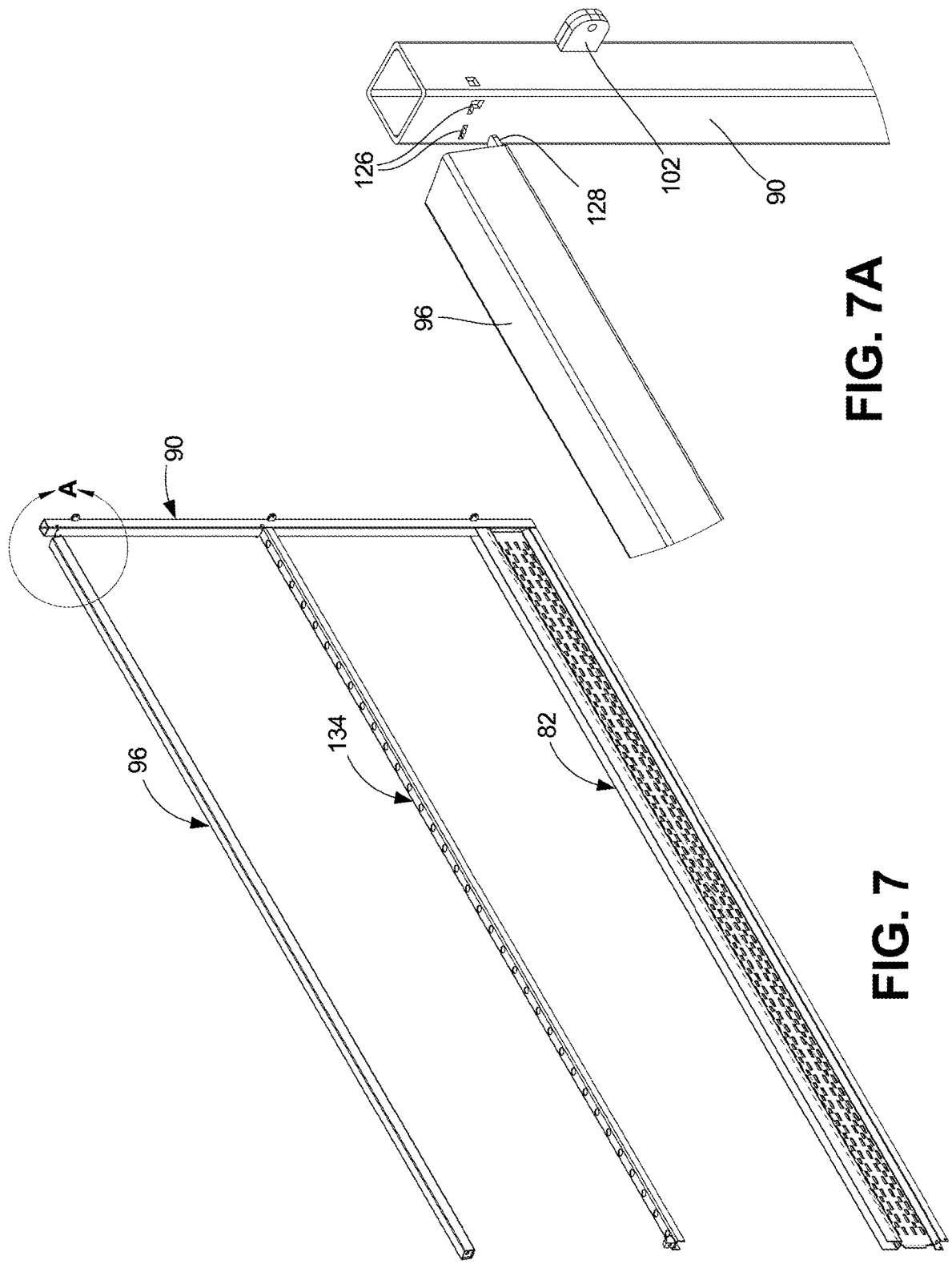
FIG. 7 is a perspective view of the components of FIG. 6 in a connected configuration, and with a top side wall tube positioned for connection to the rear support tube.
FIG. 7A is an enlarged view of the encircled portion of FIG. 7.

FIGS. 6 and 6A show rear support tube 90 and vent element 82 of FIGS. 5 and 5A with a side wall channel 134 positioned for connection thereto. In an exemplary embodiment, an end of side wall channel 134 includes tabs 128 configured for insertion in apertures 126 of rear support tube 90. Similarly, FIGS. 7 and 7A show top side wall tube 96 positioned for connection to rear support tube 90. In an exemplary embodiment, an end of top side wall tube 96 includes tabs 128 configured for insertion in apertures 126 of rear support tube 90.

Figure 9:
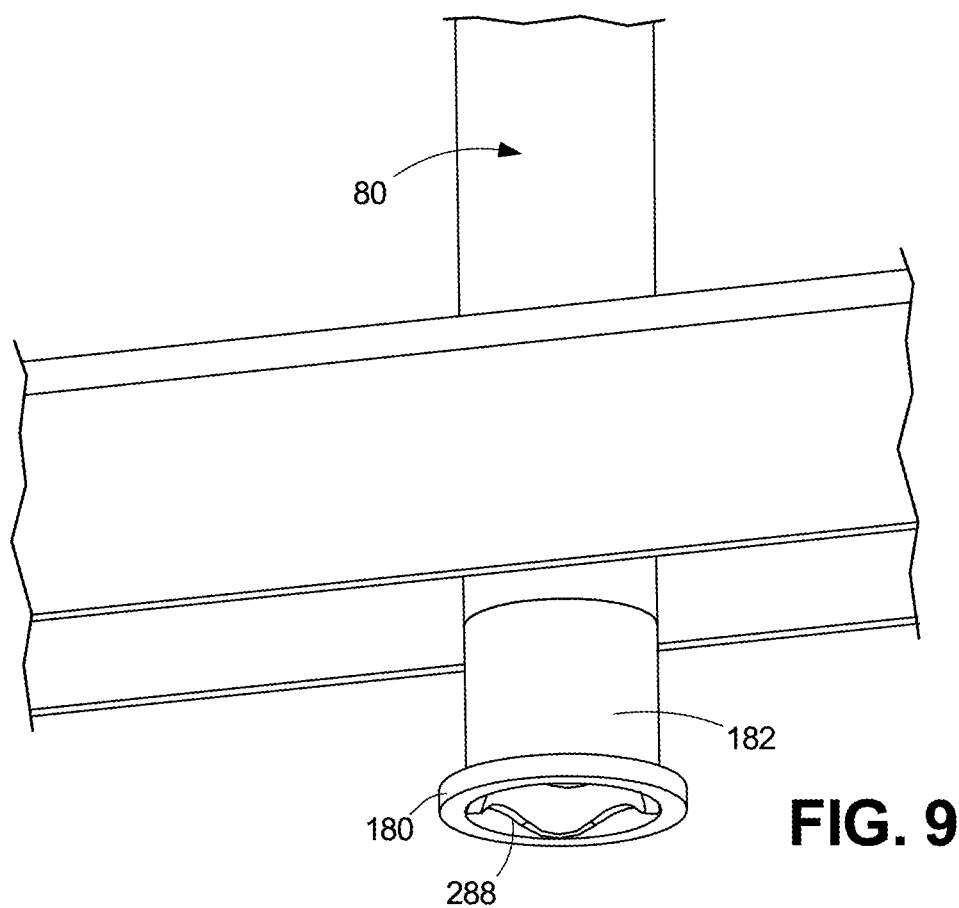
FIG. 9 is a perspective view showing a bottom portion of an exemplary grill tube as the grill tube is inserted into the side wall channel.

As shown in FIG. 8, a front end of side wall channel 134 can be supported by a board 78 inserted between channel 116 of vent element 82 and side wall channel 134. Moreover, a front end of top side wall tube 96 can be supported on a structure such as a scaffold or stand 158. FIGS. 8 and 8A additionally illustrates the insertion of a grill tube 80 upward through an aperture 162 of side wall channel 134. As shown in FIG. 9, in some embodiments, grill tube 80 includes a bottom ring 180 surrounding bottom portion 182, which prevents bottom portion 182 of grill tube 80 from passing entirely through apertures 162 in side wall channel 134. In an exemplary embodiment, bottom surface 288 of grill tube 80 is formed or provided with an undulating configuration to accommodate solder so that grill tube 80 and ring 180 can be welded together on an interior of ring 180. In an exemplary embodiment of the described modular stall system, some grill tubes 80 are provided with ring 180, while other grill tubes 80 do not have ring 180. In practice, it has been found advantageous to use grill tubes 80 having rings 180 especially near a longitudinal center point of the wall, where side channel tube 134 is not attached to rear upright support 90 or front upright support 92 (see FIG. 3). In an exemplary embodiment, among the plurality of grill tubes 80 used in the top section of side wall 72b or 72c, it is suitable to use three centrally placed grill tubes 80 having bottom rings 180 near a central portion of side wall 72b, 72c.

Figure 10:
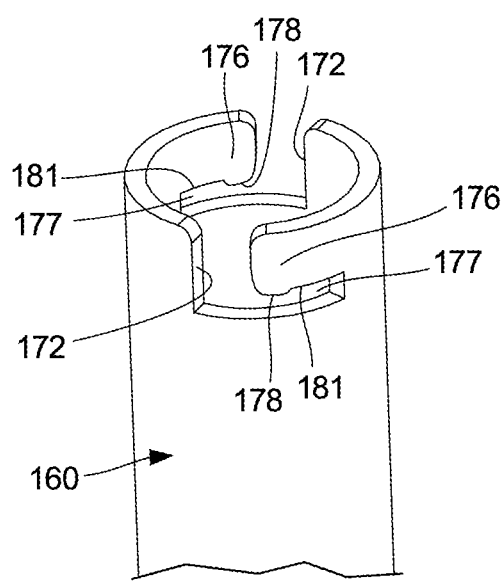
FIG. 10 is a top perspective view of the top portion of the grill tube of FIGS. 8-9.
Figure 11:
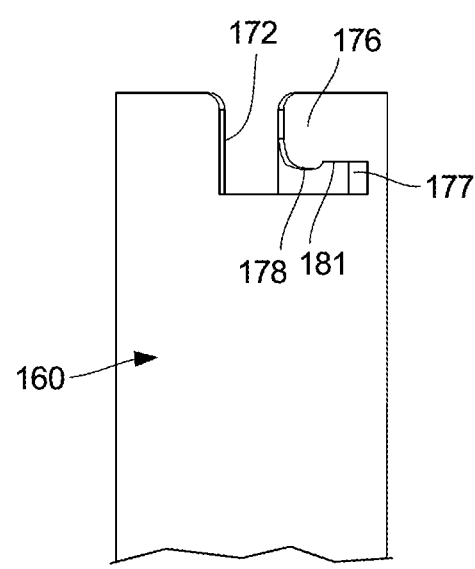
FIG. 11 is a side elevation view of the top portion of the grill tube.
Figure 12:
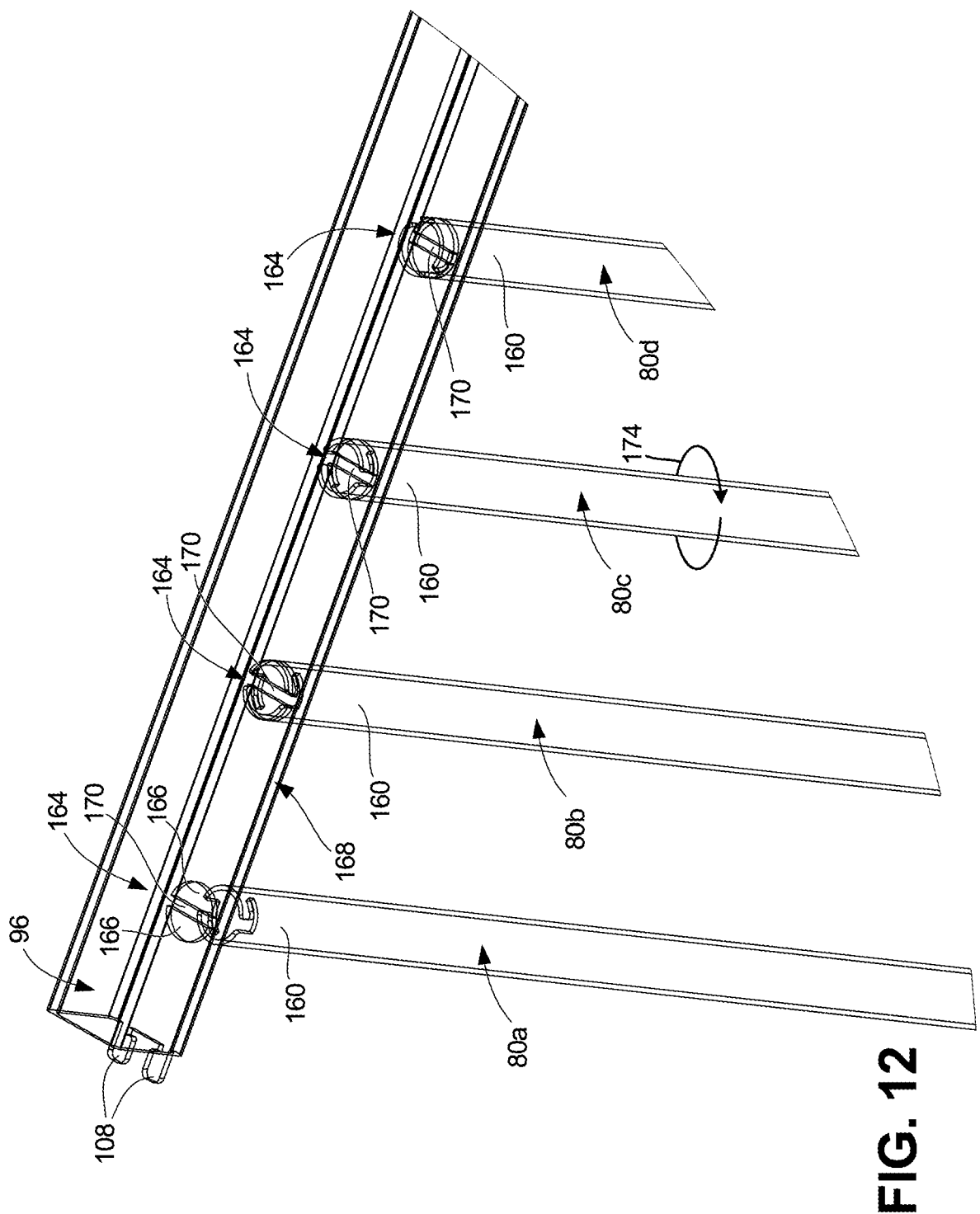
FIG. 12 is a perspective view wherein the top side wall tube is shown as transparent to illustrate the connection of the top portion of the grill tube to apertures in a bottom surface of the top side wall tube.

FIGS. 10-12 illustrate exemplary features for a system of attachment of a top portion 160 of elongated grill tube 80 to a bottom surface 168 of top side wall tube 96. Grill tube 80 has a substantially circular cross-sectional shape and has a longitudinal axis 167 that is oriented to be substantially orthogonal to bottom surface 168. FIG. 10 is a top perspective view of top portion 160 of grill tube 80. FIG. 11 is a side elevation view of top portion 160 of grill tube 80. Each grill tube 80 has an upper portion 160 having features that allow the grill tube 80 to be connected into place on top side wall tube 96 without tools and also allow a user to reverse the attachment operation to remove the grill tube 80 from top side wall tube 96 if desired. Grill tube 80 has first and second opposed end portions: top portion 160 (labeled in FIGS. 8A and 10-12) and bottom portion 182 (labeled in FIGS. 8A and 9).

In exemplary embodiment of top side wall tube 96, a plurality of sets 164 of apertures 166 are provided at discreet, preferably evenly-spaced intervals on a bottom surface 168. In an exemplary embodiment, each aperture 166 is configured as a substantially semicircular hole. However, other configurations for cooperating structures of top side wall tube 96 and top portion 160 of grill tube 80 are also possible. In the illustrated embodiment, the two semicircular apertures 166 of a set 164 are separated by bridge 170. In the illustrated embodiment, two opposed notches 172 are provided in top portion 160 of grill tube 80, the notches defining tabs 176 and slots 177. This structure allows parts of top portion 160 to be inserted into apertures 166 past bridge 170. In the illustrated embodiment, two notches 172 are provided 180 degrees apart on a circular top portion 160. However, it is contemplated that other configurations of top portion 160 may also be suitable, including fewer or more notches, of similar or different shapes, positioned evenly or unevenly, thereon. It is to be understood that changes in the configuration of top portion 160 may also necessitate corresponding changes in aperture sets 164 to provide for mutual attachment.

FIG. 12 is a perspective view wherein top side wall tube 96 is shown as transparent to illustrate the connection of top portion 160 of grill tube 80 to apertures 166 in bottom surface 168. Grill tube 80a is illustrated as positioned for insertion of tabs 176 through apertures 166. Grill tubes 80b and 80c are shown during and after passage of top portion 160, including tabs 176, through apertures 166 and above bottom surface 168 of top side wall tube 96. Grill tube 80c is rotated in direction 174 to lock tabs 176 above bridge 170, resulting in the configuration of grill tube 80d. As shown in FIGS. 10 and 11, in an exemplary embodiment, each tab 176 includes detent 178 which in an exemplary embodiment is configured as a protrusion downward from slot surface 181 of slot 177. As grill tube 80 is turned in direction 174, tab 176 resiliently deforms due to a rotational force exerted by the user, thereby allowing detent 178 to pass over bridge 170. In an exemplary embodiment, a height of the slot 177 below tab 176 has substantially the same dimension as a thickness of the lower wall of top side wall tube 96 at bottom surface 168 for a secure fit. At the end of the connection process, detent 178 is moved past bridge 170 so that slot surface 181 rests upon bridge 170 and detent 178 falls into place in aperture 166. Grill tube 80 is thereby securely attached to top side wall tube 96. For removal of grill tube 80, a sufficient force in a rotational direction opposite connection direction 174 is supplied to again resiliently deform tabs 176 to allow for movement of the detent 178 over and past bridge 170. Thus, while grill tube 80 can be removed from top side wall tube 96 by a user intent on doing so, it is unlikely that these parts will separate inadvertently due to jostling by animals or otherwise during routine use.

Figure 13:
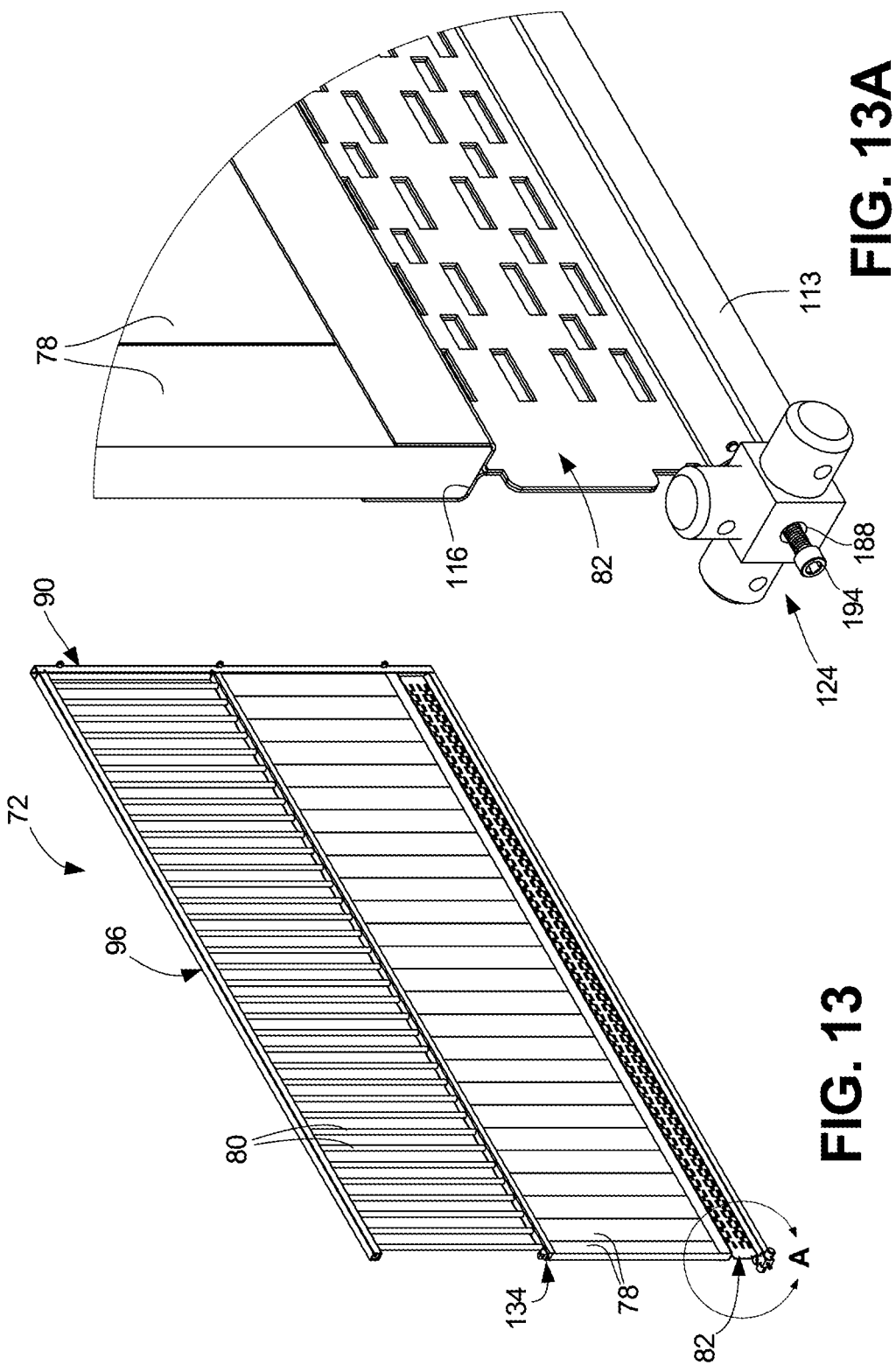
FIG. 13 shows the use of a four-way connector with the vent element.

As shown in FIGS. 8 and 13, after insertion of grill tubes 80, the wall boards 78 that are to be positioned between upper channel 116 of vent element 82 and side wall channel 134 can be inserted under the installed grill tubes 80. In an exemplary embodiment, wall boards 78 are made of wood having tongue-and-groove elements on longitudinal side edges thereof, as is known in the art. Such wall boards 78 made of wood are preferably dried and varnished before installation. However, it is contemplated that wall boards 78 having other materials and construction are also suitable, such as boards made from wood and resin composite formulations, wood and cement composite formulations, and pressed fiberboard, for example. FIG. 13 shows an exemplary side wall 72b after insertion of all of the wall boards 78 and grill tubes 80. If the last wall board 78 protrudes past the front ends of vent element 82 and side wall channel 134, the last wall board 78 can be marked and trimmed to be flush with the front ends of top side wall tube 96, side wall channel 134 and vent element 82.

As shown in FIG. 13A, four-way connector 124 is attached to vent element 82 by fastener 194, which passes through bore 188 of connector 124 and aperture 122 of plate 120 of vent element 82 (visible in FIG. 18A). As shown in FIGS. 14-14B, an exemplary embodiment of four-way connector 124 includes a substantially cube-shaped portion 184 with six faces 284. As in a cube, the six faces 284 include three sets of parallel faces, and any two non-parallel faces meet at a right angle (i.e., the non-parallel faces are orthogonal to each other). Three substantially cylindrical portions 186 extend from three faces 284 of cube portion 184. Cube portion 184 includes bore 188 therethrough having longitudinal axis 296. Each cylindrical portion includes a hole or bore 190 therethrough having longitudinal axis 298. In an exemplary embodiment, all of the axes 296, 298 are substantially parallel to each other. In an exemplary embodiment, some or all of bores 188, 190 are internally threaded to mate with fasteners that are correspondingly externally threaded. In an exemplary embodiment, a portion of bore 188 is wider to accommodate a recessed head of fastener 194.

FIG. 15 is a perspective view showing a front upright support tube 92 connected to four-way connector 124 and two front floor tubes 98 positioned for attachment to connector 124. FIG. 15A is an enlarged view of the encircled portion of FIG. 15. A top cylindrical portion 186 of four-way connector 124 is inserted into a bottom end of front upright support 92. Four-way connector 124 is secured to the bottom end of front upright support 92 by fastener 192, such as a knurled pin, inserted in an aperture of front upright support 92 and bore 190 of cylindrical portion 186. Another fastener 194 (shown in FIG. 13A) is inserted into bore 188 of cube portion 184 to attach four-way connector 124 to end wall 120 via aperture 122. Simultaneously, the front edge of middle portion 112 of vent element 82 is inserted into a slot on a rear surface of front upright support 92. In this way, vent element 82 and front upright support 92 are connected together. Each of front floor tubes 98 is attached to connector 124 by inserting one of the lateral cylindrical portions 186 of connector 124 into one of front floor tubes 98. Fasteners such as fasteners 192 can be used in a similar manner for front floor tubes 98, as explained above with front upright support 92.

Figure 16:
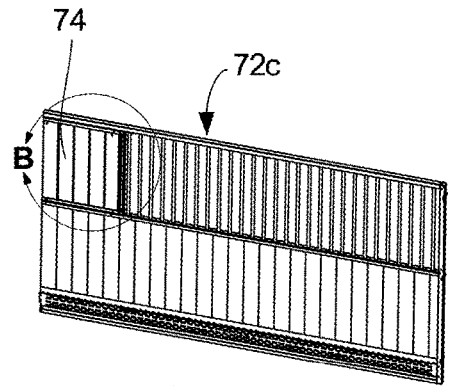
FIG. 16 is a perspective view showing a side wall with a privacy wall feature.
Figure 17A:
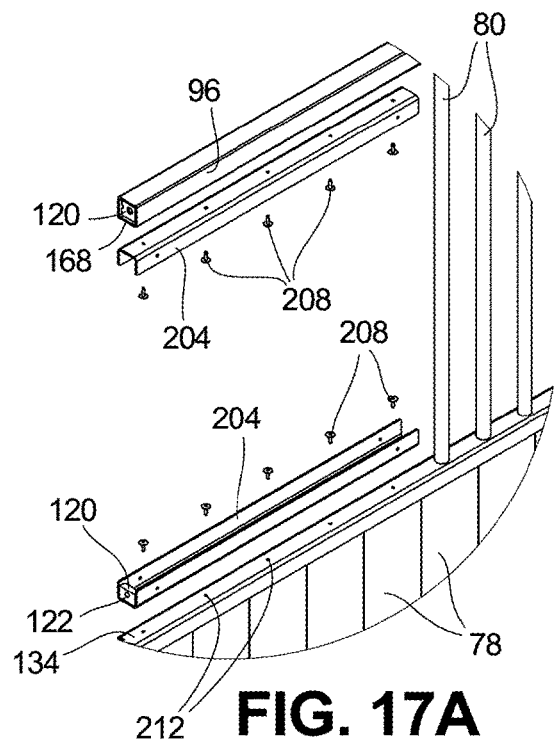
FIG. 17A is an exploded view showing components for installation of the privacy wall feature of FIG. 16.
Figure 17B:
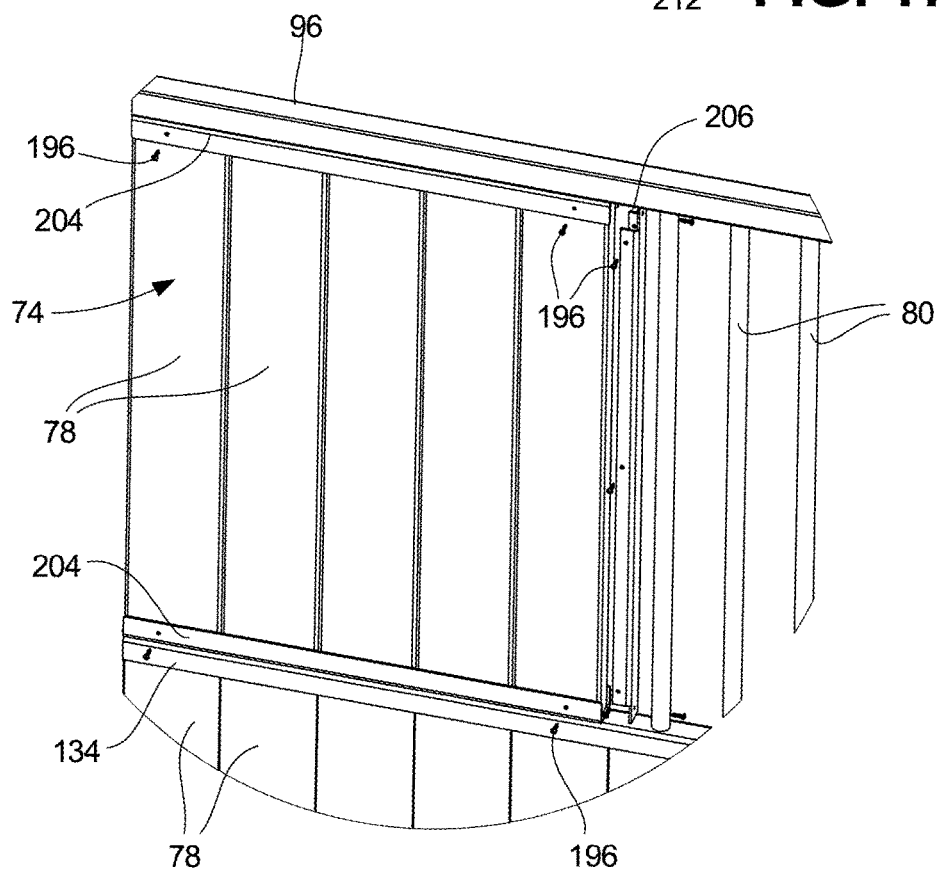
FIG. 17B shows a subsequent step in the privacy wall installation procedure.

FIG. 16 is a perspective view showing a side wall 72*c* with a privacy wall feature 74. FIG. 17A is an exploded partial view showing components for installation of the privacy wall feature 74. FIG. 17B shows a subsequent step in the privacy wall installation procedure. As shown in FIG. 17A, wall channels 204 at attached to bottom surface 168 top side wall tube 96 and a top surface of side wall channel 134, such as by fasteners 208. In an exemplary embodiment, top side wall tube 96 and side wall channel 134 will be prepared with apertures 212 to accept the fasteners 208, rather than the apertures 66, 162 on the open grill tube portions of the upper section of wall 72*c*. After wall channels 204 are fastened to top side wall tube 96 and side wall channel 134, a plurality of boards 78 are slid therebetween. Privacy wall upright 206 is attached to and end of the privacy wall feature 74 thereby formed. This attachment is achieved by the insertion, in an exemplary embodiment, of button head socket screw 208 into aperture 210 of privacy wall upright 206 and an aligned bore 142 of boss 136. While particular fasteners are described herein, it is contemplated that other known fasteners or bond agents, whether mechanical or chemical, for example, can also be used. The boards 78, wall channels 204 and privacy wall upright 206 can be secured together, such as with fasteners 196 such as wood screws. As shown in FIG. 18, a solid wall 72*a* can be formed using full length wall channels 204.

FIG. 18 shows the use of a three-way connector 198 with the vent element 82 and a front floor tube 98. FIG. 18A is an enlarged view of the encircled portion of FIG. 18. Three-way connector 198 is used with the components of the disclosed modular stall system in a similar manner as four-way connector 124. However, in an arrangement of stalls 66 in which another front floor tube 98 will not be connected to the right of three-way connector 198, use of the three-way connector 198 rather than four-way connector 124 eliminates the projection of an unused cylindrical portion 186.

FIG. 19 is a perspective view of an exemplary three-way connector 198. FIG. 19A is a side elevation view of the three-way connector 198. FIG. 19B is a cross-sectional view of the three-way connector 198, taken along line B-B of FIG. 19A. Such a three-way connector 198 is similar to the four-way connector 124 shown in FIG. 14 but eliminates one of the cylindrical portions 186. Accordingly, descriptions pertaining to four-way connector 124 also apply to three-way connector 198.

FIG. 20 is a perspective view showing front upright support tubes 92 connected to respective top side wall tubes 96 by three-way connector 198 and four-way connector 124. FIG. 20A is an enlarged view of the encircled portion "A" of FIG. 20. FIG. 20B is an enlarged view of the encircled portion "B" of FIG. 20. Front top tubes 100 (shown in FIG. 21) can be attached to the connectors 198, 124 in a similarly manner as the attachment of front floor tubes 98 thereto.

As shown in FIG. 20, front floor tube 98*a* is shorter than front floor tube 98*b*. Moreover, wall channels 204*a* are shorter than wall channels 204*b*. Additionally, the placement of wall channels 204 of desired size at any location on front floor tubes 98 allows a user to place a door opening toward a left, right, or central location on a stall 66. Similarly, many of the described components of the disclosed modular livestock stall system can be provided in different lengths to facilitate the installation of stalls of customizable sizes and element positions.

Figure 22:
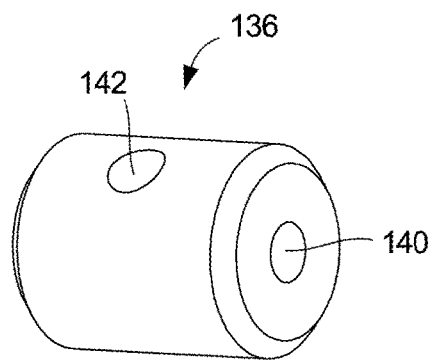
FIG. 22 is a perspective view of an exemplary boss configured for insertion into an exemplary support tube.
Figure 22A:
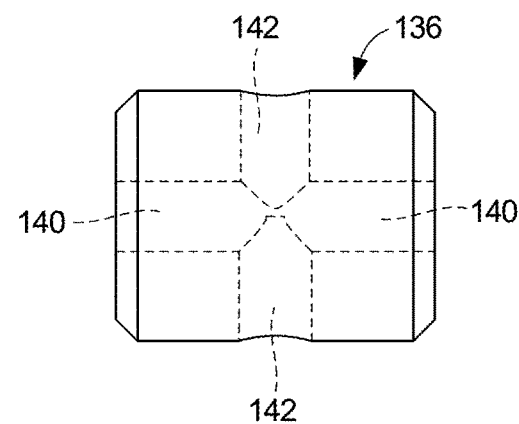
FIG. 22A is a side elevation view of the boss of FIG. 22.
Figure 23:
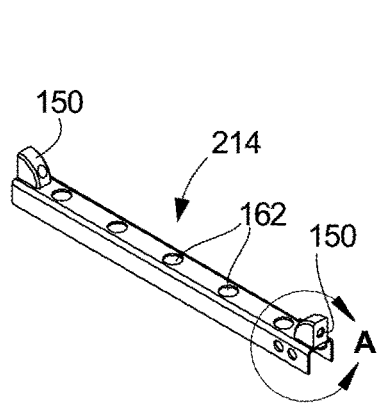
FIG. 23 is a perspective view of an exemplary front channel with bracket.
Figure 23A:
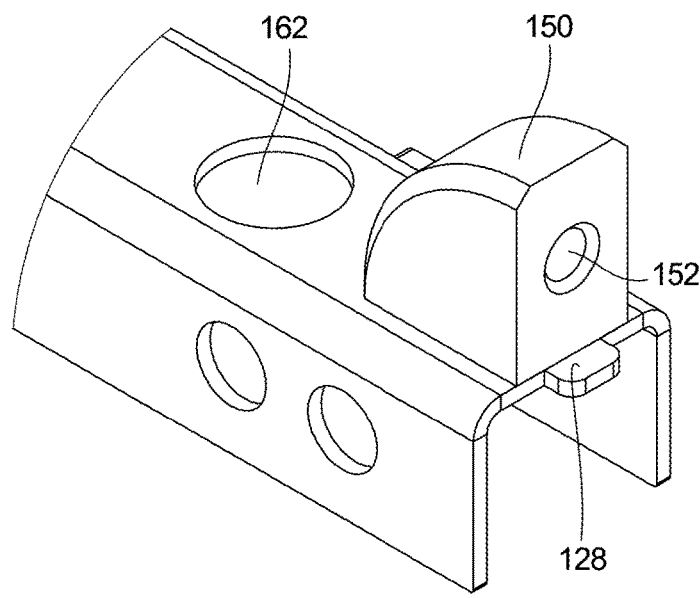
FIG. 23A is an enlarged view of the encircled portion of FIG. 23.

FIG. 21 is a perspective view showing front upright support tubes 92 connected to front channels 214 by boss and bracket assemblies. FIG. 21A is an enlarged view of the encircled portion of FIG. 21. Front upright support 92 includes boss 136 inserted into an aperture 138. In an exemplary embodiment, boss 136 is fixedly attached to front upright support 92, such as by welding, for example. As shown in FIGS. 22 and 22A, an exemplary embodiment of boss 136 includes bores 140 and 142 passing therethrough in substantially orthogonal directions. One or more of bores 140, 142 can be internally threaded to threadably attach to a lag screw or bolt 144, for example. In a completed joint, fastener 144 is countersunk or otherwise contained in boss 136 and front upright support 92 so that it does not protrude therefrom. This advantageously prevents animal contact with the fasteners.

In an exemplary embodiment, front wall channel 214 includes a bracket 150 fixed to a top surface thereof, and having bore 152 for the insertion of bolt 144. In an exemplary method for attaching front wall channel 214 to front upright support 92, bolt 144 is inserted into bore 152 of bracket 150 and threadably engaged through a corresponding hole in front upright support 92 with bore 142 of boss 136. At the same time, tab 128 is received in a corresponding slot of front upright support 92. The two points of connection of front wall channel 214 to front upright support 92 at tab 128 and bolt 144 securely retain the front wall channel 214 and front upright support 92 in the desired positions by preventing relative rotational and other displacement between front wall channel 214 and front upright support 92. In many respects, front wall channel 214 is similar to side wall channel 134 except in length. As shown in FIG. 24, front wall portions 68*a*, 68*b* are formed thereafter in a manner similar to that described with respect to side walls 72.

FIG. 24 is a front perspective view showing installation of a door jamb 218 to a front wall portion 68*b*. FIG. 24A is an enlarged view of the encircled portion of FIG. 24. A bottom portion of door jamb 218 includes plug 220 with a semi-hemispherical bottom portion 222. This structure allows a user to tilt door jamb 218 into position, such as shown in FIG. 24, wherein the downwardly projecting bottom portion 222 retains door jamb 218 within aperture 200 of front floor tube 98, yet allows extensive freedom of movement for alignment purposes. Door jamb 218 has a boss 136 like that of front upright support 92 to allow door jamb 218 to be secured to front wall channel 214 at a joint including bracket 150, similar to the joint described with reference to FIGS. 21-23A. FIG. 24 shows a second door jamb 218 similarly installed on the other side portion of front wall 68.

Figures 25, 25A:
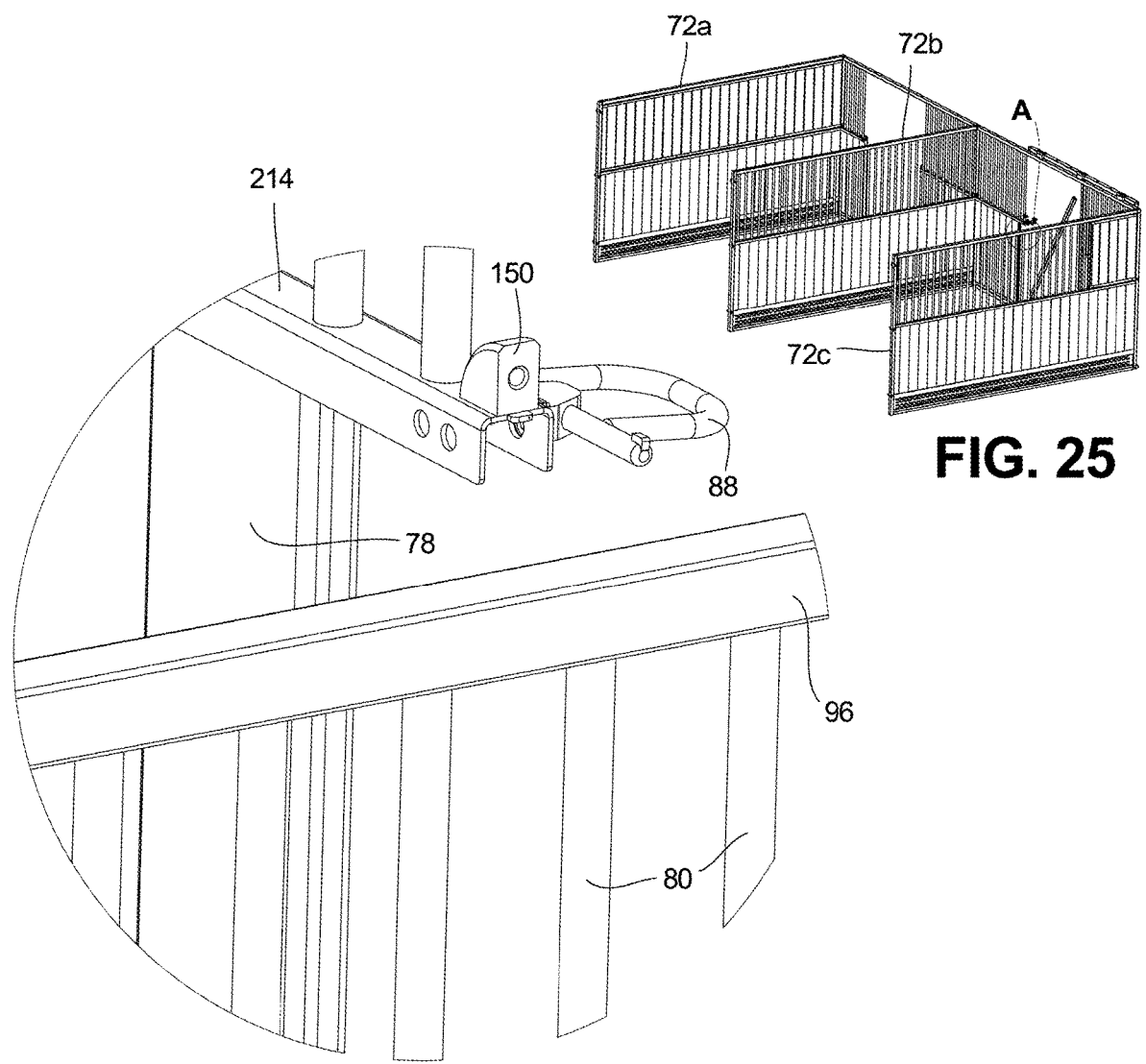
FIG. 25 is a perspective view showing installation of a door latch to the first front wall portion.
FIG. 25A is an enlarged view of the encircled portion of FIG. 25.

FIG. 25 is a perspective view showing installation of a door latch 88 to front wall channel 214. FIG. 25A is an enlarged view of the encircled portion of FIG. 25. In an exemplary embodiment, latch 88 is attached to front channel 214 via torque screws 216.

Figure 26:
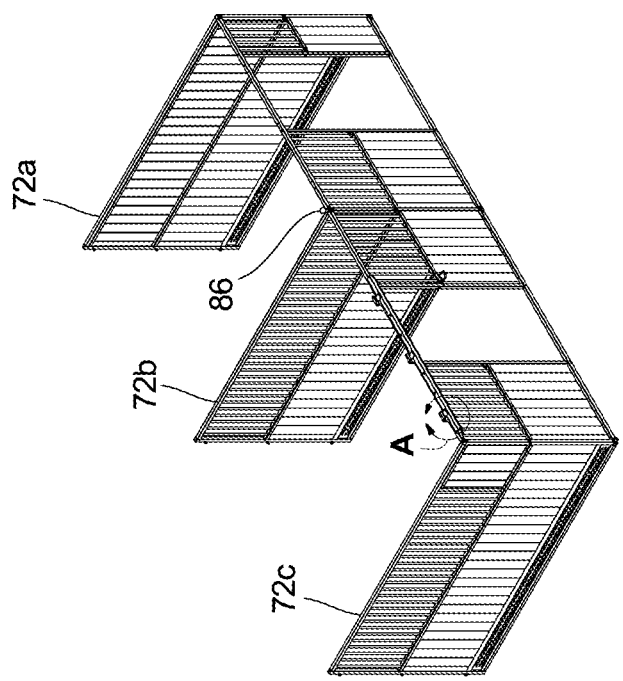
FIG. 26 is a perspective view showing an assembly of the door track and the front top tube.
Figure 26A:
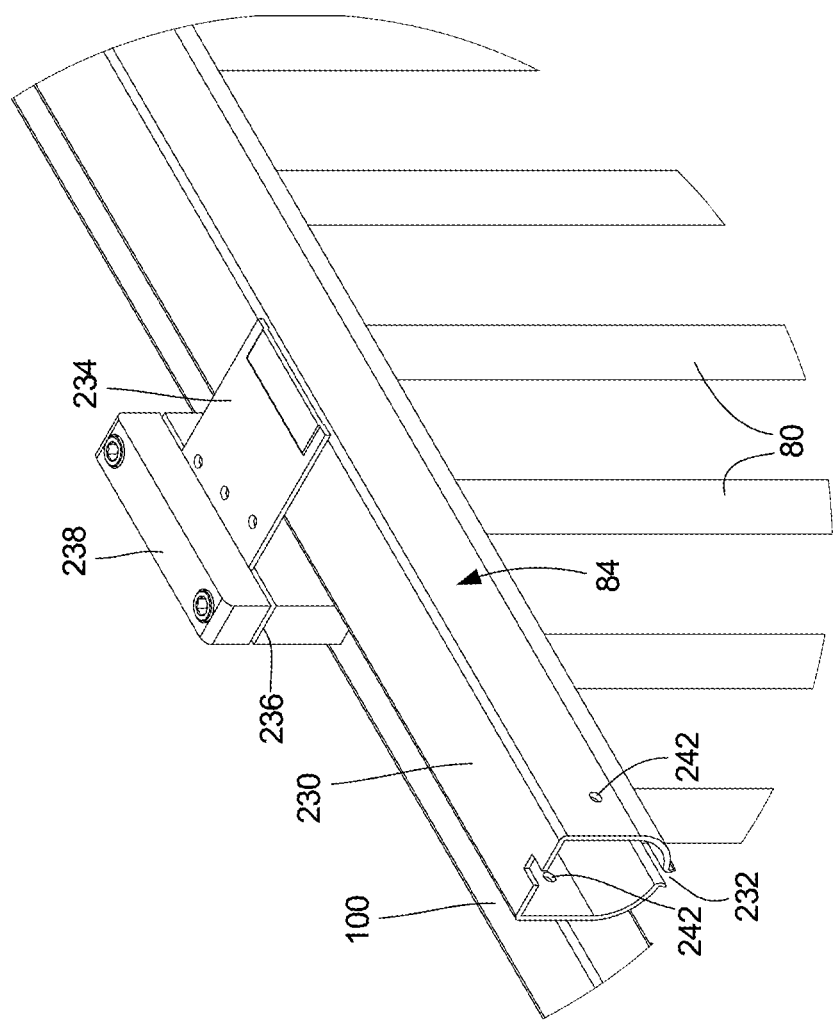
FIG. 26A is an enlarged view of the encircled portion of FIG. 26.

FIG. 26 is a perspective view showing an assembly of the door track 84 and the front top tube 100. FIG. 26A is an enlarged view of the encircled portion of FIG. 26. In an exemplary embodiment, door track 84 is a substantially tubular member 230 with a longitudinal slot 232 in a bottom portion thereof. Flanges 234 are attached to or otherwise provided on an upper or other portion of tubular member 230. Flanges 234 are configured for insertion into receiving slots 236 of clamp block 238 affixed to front top tube 100.

Figure 40:
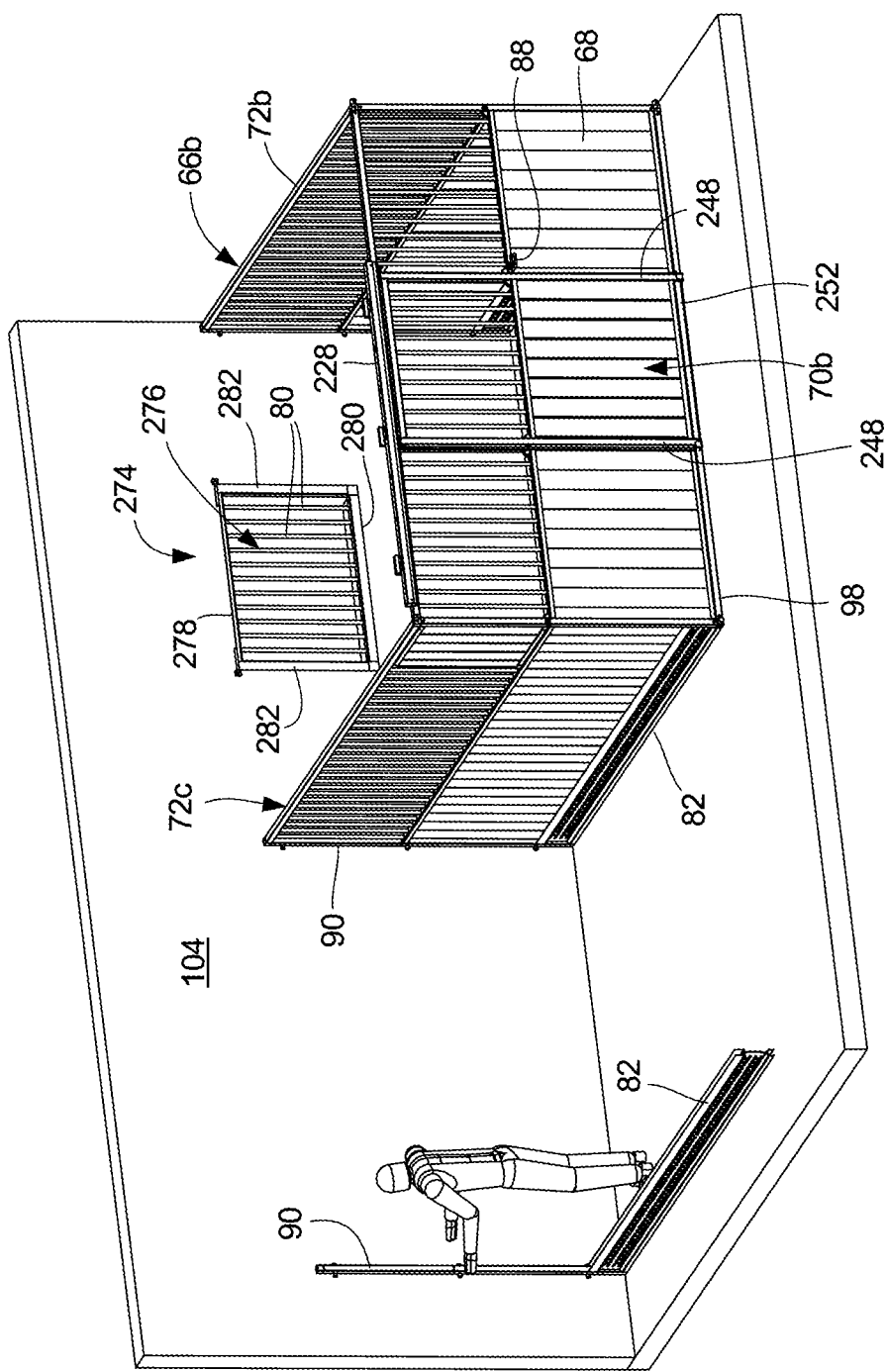
FIG. 40 is a perspective view showing one completed livestock stall and the first steps for construction of an adjacent second stall. Additionally.

FIG. 27 shows insertion of trollies 240 of a door top frame 228 into the door track 84. FIG. 27A is an enlarged view of the encircled portion of FIG. 27. FIG. 27B shows the trollies 240 removed from the door track 84. As shown in FIG. 27B, trollies 240 are attached to door top frame 228, such as by the use of nuts, washers and bushings. Accordingly, top door frame 228, and thus door 70b, are suspended from trollies 240, which, as shown in FIG. 27A, are received within tubular member 230 of door track 84. Referring to FIG. 26A, in an exemplary embodiment, a bolt can be installed in cross holes 242 at both ends of door track 84 to retain trollies 240 within tubular member 230 of door track 84. Referring to FIGS. 3 and 40, it can be seen that sliding door 70b may be formed in a manner similar to that described with respect to walls 72, 68, using similar components. In a completed stall 66, grill tubes 80 and boards 78 have been installed on door 70 in a similar manner as described with reference to the side walls 72 and front wall 63. As shown in FIG. 3, in an exemplary embodiment, a door side frame 248 includes lock 250 for cooperation with latch 88. FIG. 3 shows that door side frames 248 are attached to door bottom frame 252. The attachment of these frame members to each other may be accomplished using similar components as described below with reference to gate door 70a.

Figure 28A:
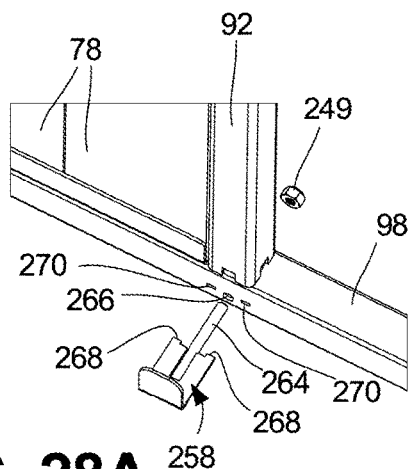
FIG. 28A is a partial perspective view showing installation of a door guide into the front floor tube.
Figure 28B:
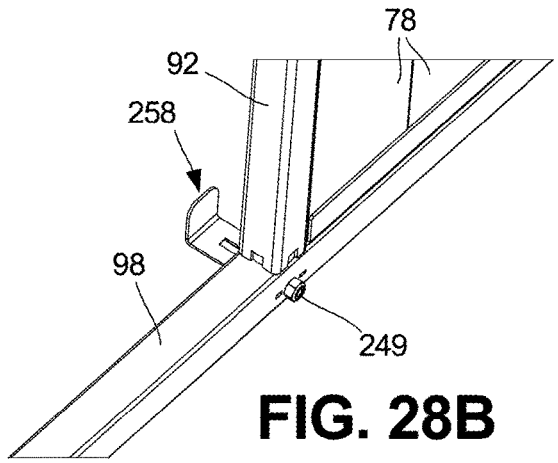
FIG. 28B is a partial perspective view showing the installed door guide from the inside of the stall.

Please refer to FIG. 3 for illustrations of door guide 258, door stop 260 and door bumper 262. FIG. 28A shows alignment of door guide 258 with front floor tube 98 for attachment thereto. In an exemplary embodiment, door guide 258 includes rod 264 for insertion into aperture 266 of floor front tube 98 and tabs 268 for insertion into apertures 270 of front floor tube 98. A nut 249 secures the end of rod 264. FIG. 28B shows the assembled door guide 258 from an interior of the stall 66.

Figure 29A:
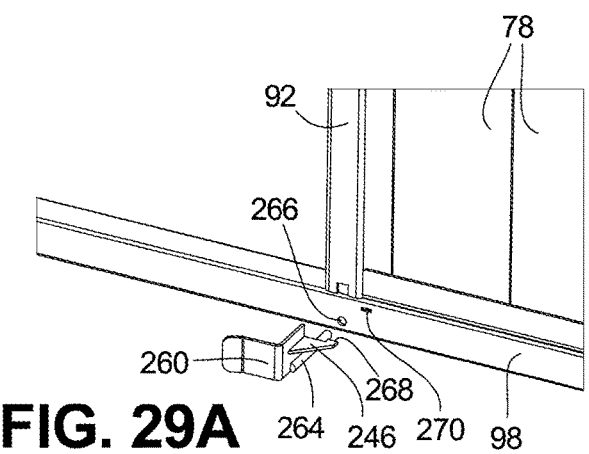
FIG. 29A is a partial perspective view showing installation of a door stop on the front floor tube.
Figure 29B:
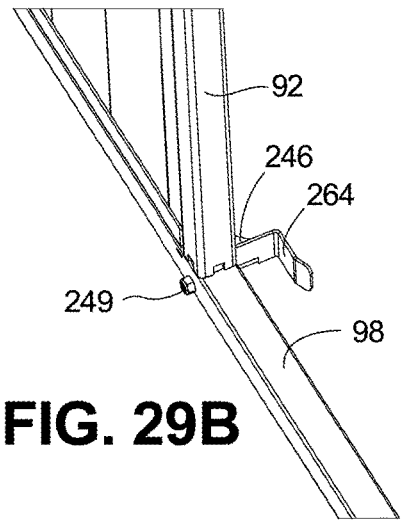
FIG. 29B is a partial perspective view showing the installed door stop from the inside of the stall.

FIG. 29A is a partial perspective view showing installation of a door stop 260 on the front floor tube 98. FIG. 29B is a partial perspective view showing the installed door stop 260 from the inside of the stall 66. Tab 264 is provided on a structural rib plate 246. Door stop 260 is attached to front floor tube 98 in a manner similar to the attachment of door guide 258 to front floor tube 98.

Figure 30A:
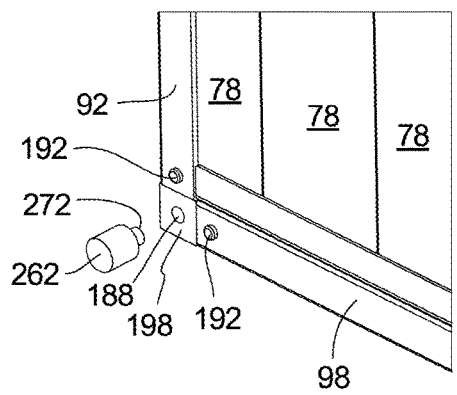
FIG. 30A is a partial perspective view of a door bumper aligned for insertion into a three-way connector attached to a front floor tube and front upright support.
Figure 30B:
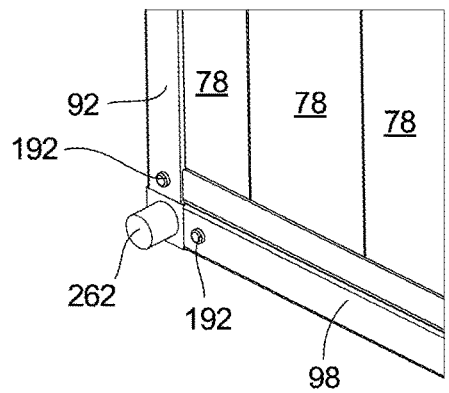
FIG. 30B is a partial perspective view showing the installed door bumper.

FIG. 30A is a partial perspective view of a door bumper 262 aligned for insertion into a three-way connector 198 attached to a front floor tube 98 and front upright support 92. FIG. 30B is a partial perspective view showing the installed door bumper 262. Door stop 262 is attached to bore 188 of either four-way connector 124, three-way connector 198, or an analogous connector. In an exemplary embodiment, shaft 272 of door bumper 262 is threaded into bore 188.

Figure 31:
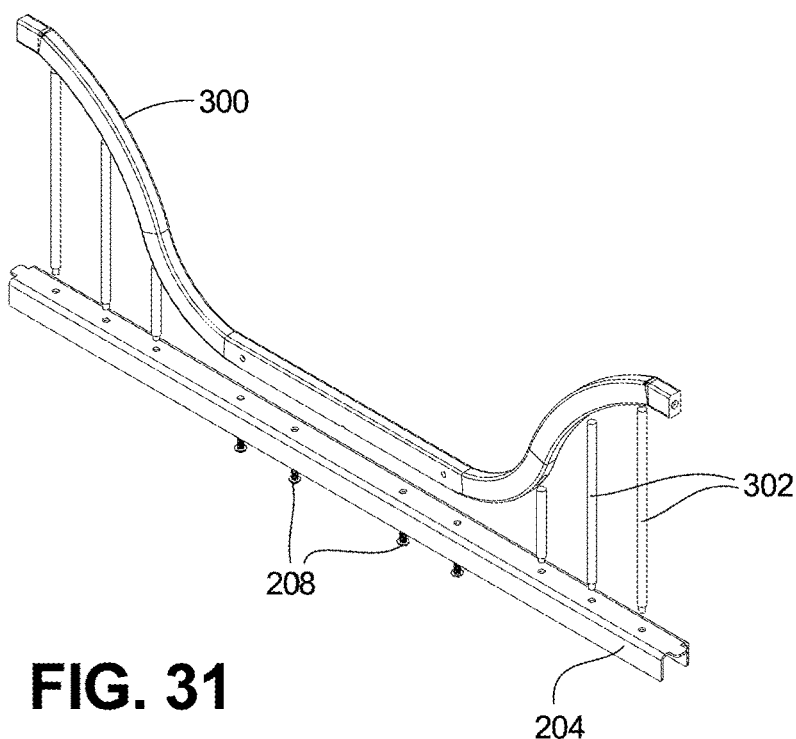
FIG. 31 is an exploded perspective view of a gate top element.
Figure 32:
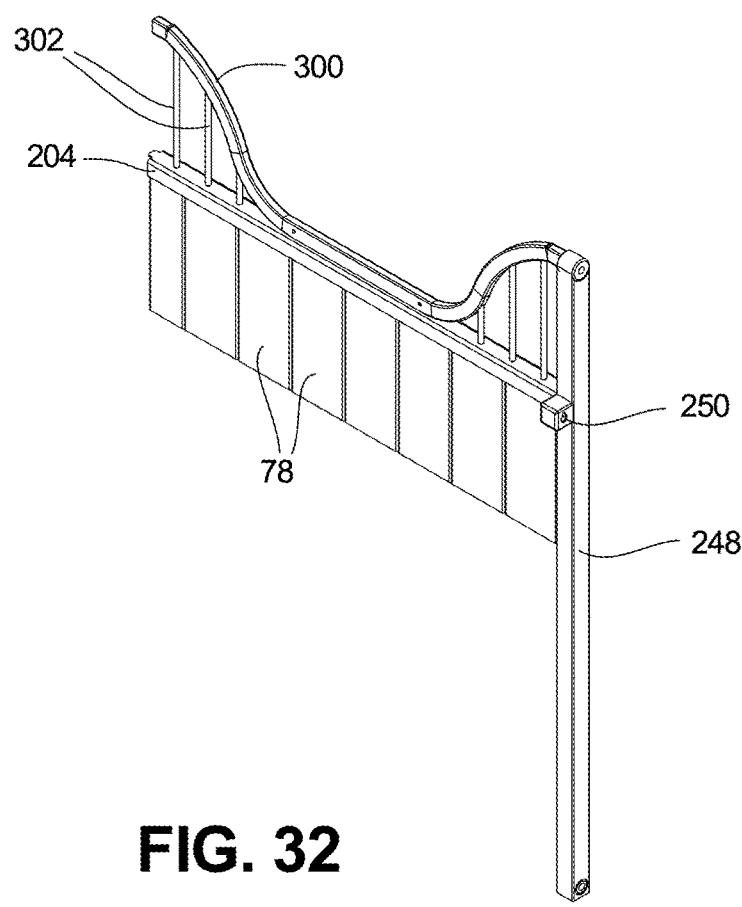
FIG. 32 shows boards connected to the gate top element.
Figure 33:
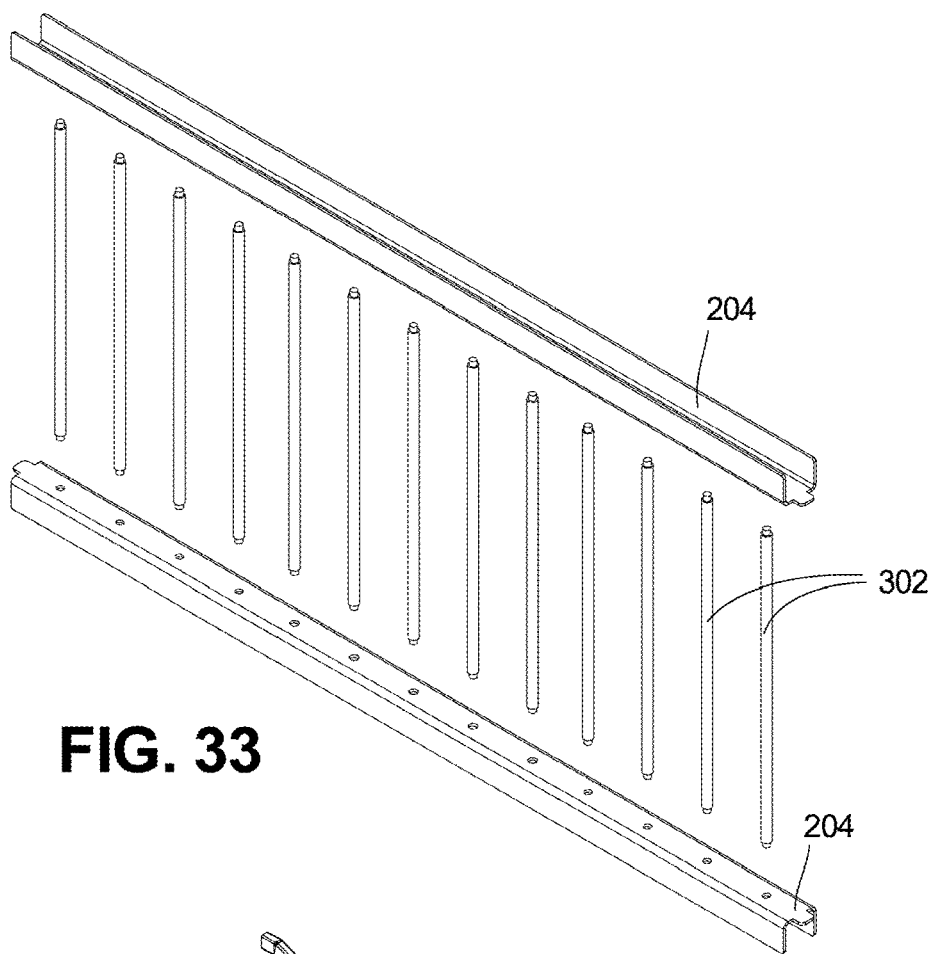
FIG. 33 is an exploded perspective view of a gate middle element.
Figure 34:
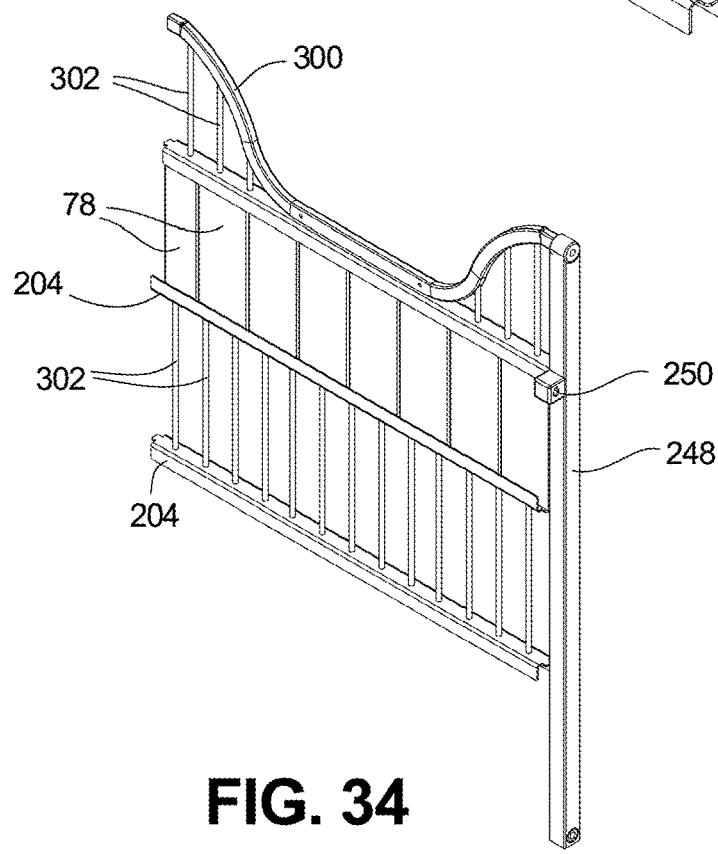
FIG. 34 shows the gate middle element connected to the boards of FIG. 32.
Figure 35A:
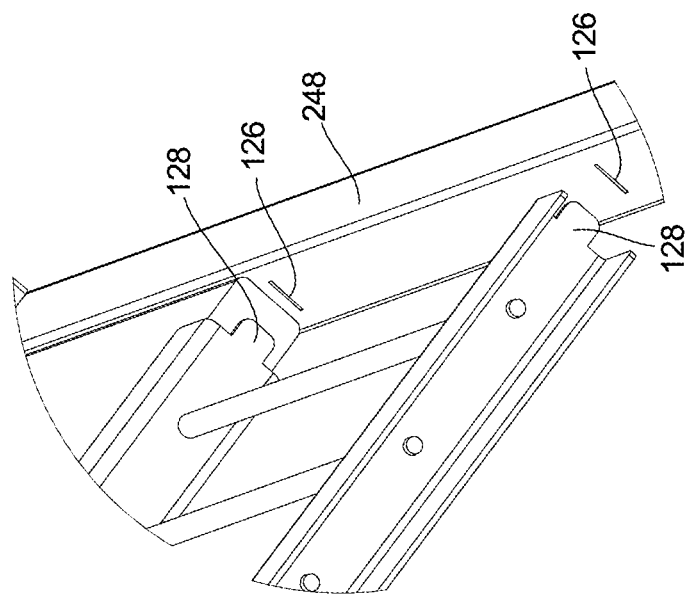
FIG. 35A is an enlarged view of the encircled portion of FIG. 35.
Figure 35:
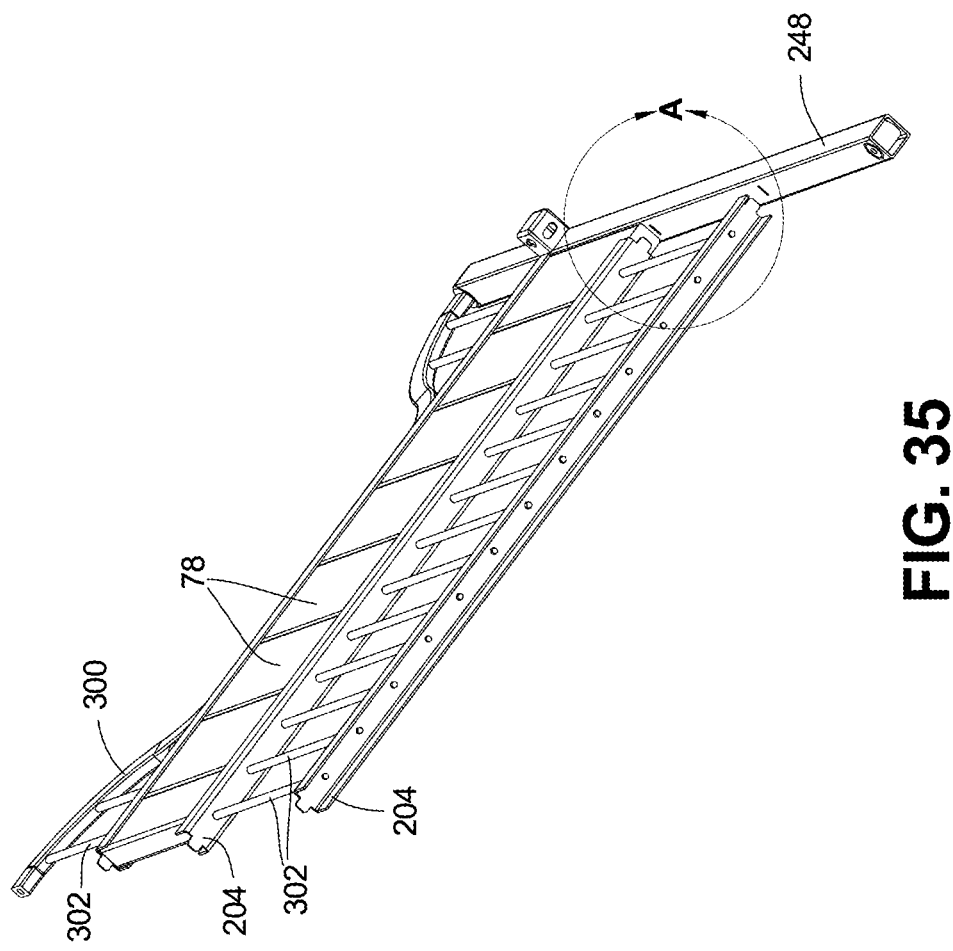
FIG. 35 shows the gate middle element positioned for connection to a gate side frame tube.
Figure 36:
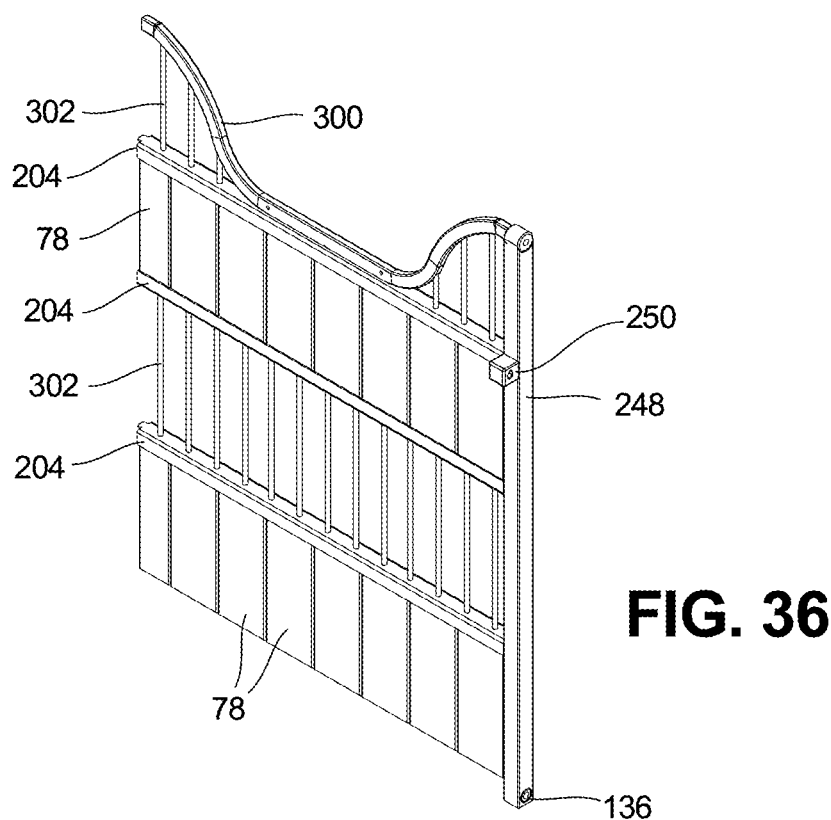
FIG. 36 shows additional boards connected to the gate middle element.
Figure 37:
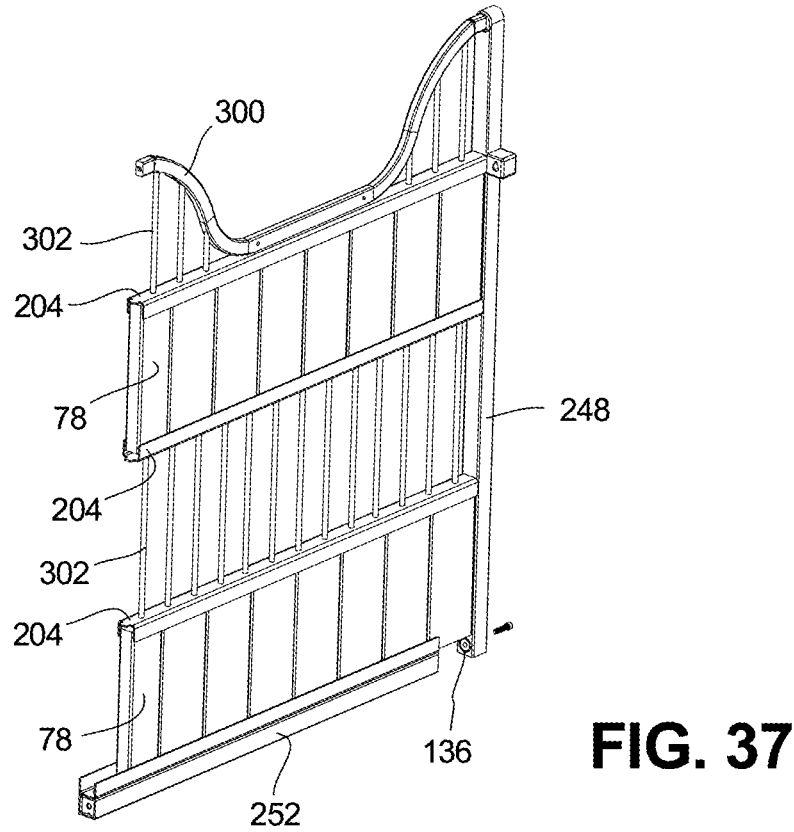
FIG. 37 shows a gate bottom frame tube positioned for connection to the additional boards and the gate side frame tube.
Figure 39A:
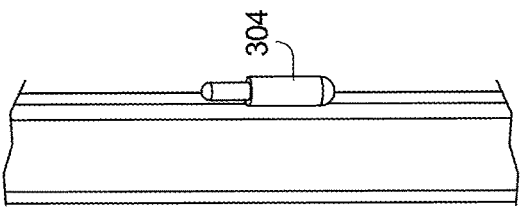
FIG. 39A is an enlarged view of the encircled portion "A" of FIG. 39.
Figure 39B:
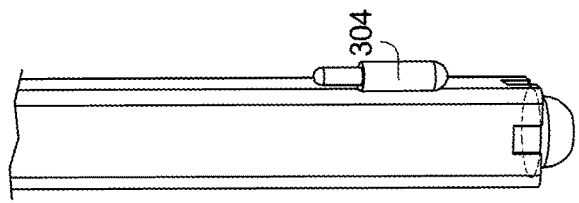
FIG. 39B is an enlarged view of the encircled portion "B" of FIG. 39.
Figure 39:
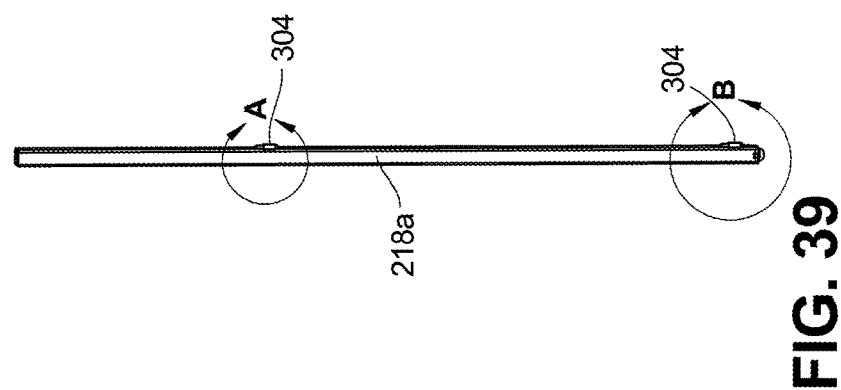
FIG. 39 is a perspective view of a door jamb configured for use with the gate of FIGS. 31-38.
Figure 38:
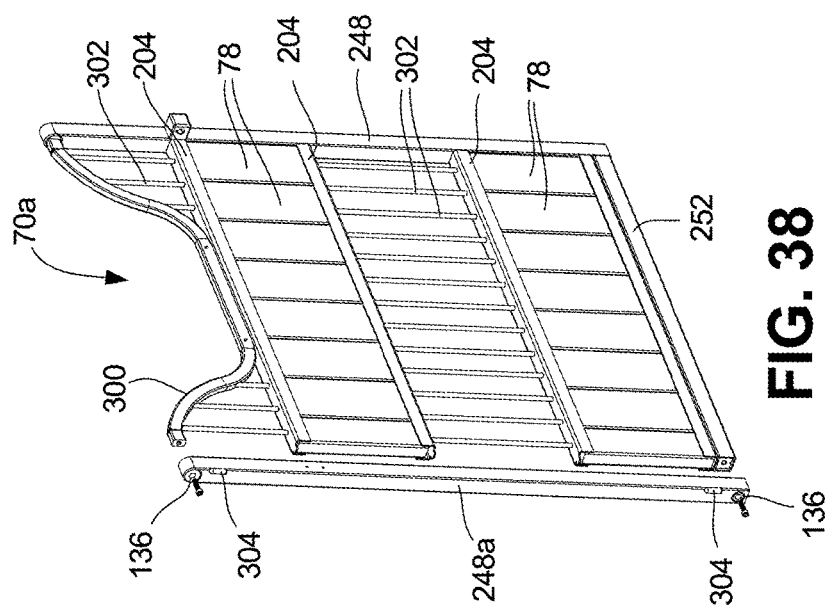
FIG. 38 shows a second gate side frame tube positioned for connection.

FIG. 31 is an exploded perspective view of a gate top assembly including top frame 300, spindles 302, wall channel 204 and fasteners 208. While an arched configuration of top frame 300 is illustrated, other configurations are also possible. FIG. 32 shows boards 78 and door side frame 248 connected to the gate top assembly. FIG. 33 is an exploded perspective view of a gate middle assembly including wall channels 204 and spindles 302. FIG. 34 shows the gate middle element connected to the boards 78 of FIG. 32. FIG. 35 is a bottom perspective view showing the wall channels 204 positioned for connection to a gate side frame 248. FIG. 35A is an enlarged view of the encircled portion of FIG. 35, showing the alignment of tabs 128 for insertion into apertures or slots 126. FIG. 36 shows additional boards 78 connected to wall channel 204. FIG. 37 shows a gate or door bottom frame 252 positioned for connection to the additional boards 78 and the gate or door side frame 248. FIG. 38 shows a second gate side frame 248 positioned for connection to complete the gate 70a. FIG. 39 is a perspective view of a door jamb 218a configured for use with the gate of FIGS. 31-38. FIG. 39A is an enlarged view of the encircled portion "A" of FIG. 39. FIG. 39B is an enlarged view of the encircled portion "B" of FIG. 39. Door jamb 218a and door side frame 248a feature cooperating hinge elements 304.

FIG. 40 is a perspective view showing one completed livestock stall 66b and the first steps for construction of an adjacent second stall 66. Additionally, FIG. 40 shows a grilled window cover 274 that can be custom fit to an existing window opening. FIG. 40 shows installation steps for an adjacent stall, including attaching rear upright support 90 to wall 140 and vent element 82 to rear support 90. A distance between adjacent rear supports 90 is the same as a length of front floor tube 98. Proceeding as described above, any number and arrangement of stalls 66 can be constructed.

Moreover, while particular configurations of the modular components is illustrated, it is contemplated that other configurations are possible. For example, door 70b is designed in the illustrated stall 66b to slide open to the left, when viewed from the front of the stall from the outside. However, the placement of latch 88, lock 250, door guide 258, door stop 260 and door bumper 262 can be changed to allow door 70 to slide open to the right (some components omitted in FIG. 40 but shown in FIG. 3).

FIG. 40 shows an exemplary grilled window cover 274 that can be constructed to custom fit into an existing window opening 276. Components of window cover 274 include a top tube 278 that is similar to top side wall tube 96; window channel 280 that is similar to side wall channel 134; and side frames 282 that are similar to door side frames 248. In an exemplary embodiment, grill tubes 80 are inserted up through apertures (like apertures 162) of window channel 280 and secured to aperture sets (like aperture sets 164) in top tube 278 before window cover 274 is secured in place in window opening 276.

Figure 41A:
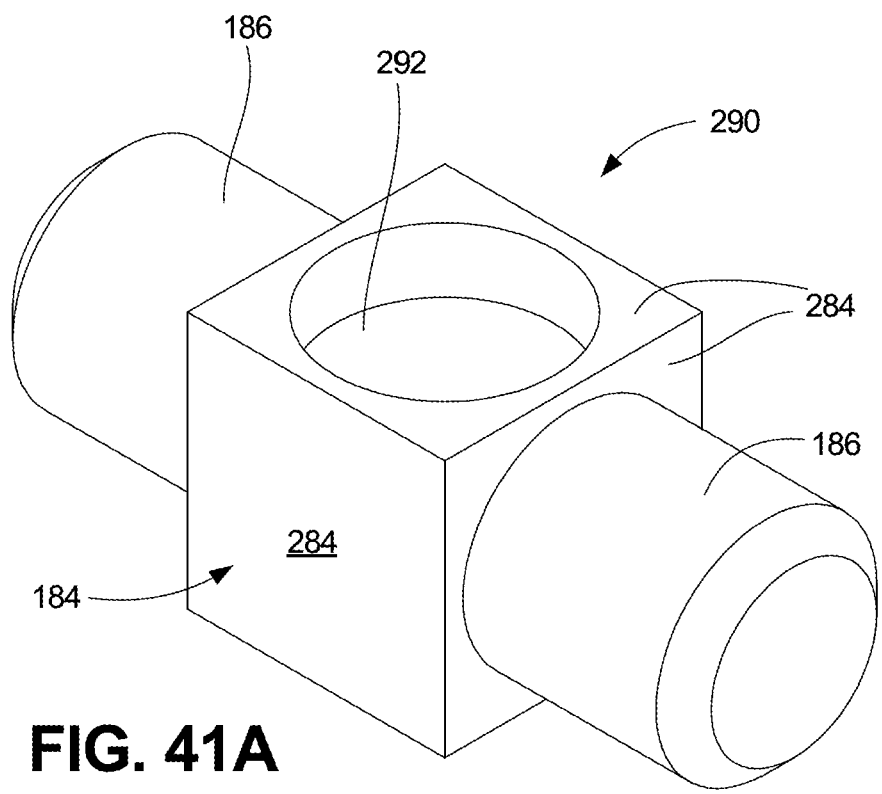
FIG. 41A is a top perspective view of a connector element that is formed in an intermediate step for manufacture of the four-way connector of FIG. 18.
Figure 41B:
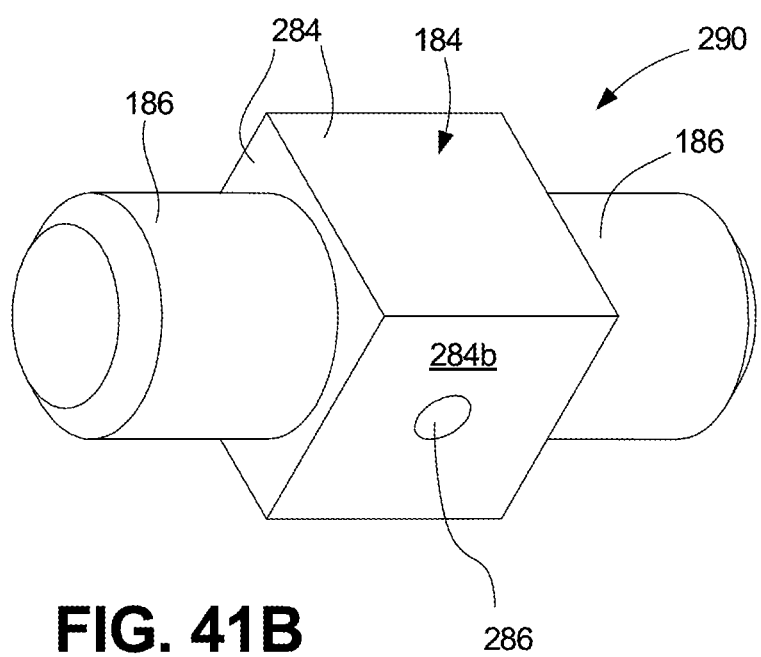
FIG. 41B is a bottom perspective view of the connector element of FIG. 41A.

FIG. 41A is a top perspective view of a connector element 290 that is formed in an intermediate step for manufacture of the four-way connector 124. FIG. 41B is a bottom perspective view of connector element 290. In an exemplary embodiment, connector element 290 is formed from a square bar, such as a bar made of steel for example, having an indeterminate length and a side dimension of about 1.75 inch. Using milling equipment such as a laser cutter or lathe, the square bar is cut off to the illustrated length. In an example, the square bar is turned on a CNC (Computer Numerical Control) lathe and shaped to produce cube portion 184 having two cylindrical portions 186 on opposite faces 284 thereof. In an exemplary embodiment, each cylindrical portion 186 has a diameter of about 1.50 inch. Aperture 292 is bored into cube portion 184 for the acceptance of a third cylindrical portion 186, which is brazed into place (as shown in FIGS. 14-14B). Thereafter, bores 188, 190 and 286 are machined into connector 124. It is to be understood that a similar process can be used to form three-way connector 198 of FIGS. 19-19B. In that case, the square bar would be turned on a lathe to produce a connector element with cube portion 184 and only one extending cylindrical portion 186.

Connector element 290 can also be used as a two-way connector where appropriate. Such a two-way connector is similar in many respects to the four-way connector 124 shown in FIG. 14 and the three-way connector 198 shown in FIG. 19. Accordingly, descriptions pertaining to those connectors also apply to such a two-way connector.

In some embodiments, a bottom face 284b of cube portion 184 includes bore or aperture 286, which in an exemplary embodiment is a tapped hole configured to accept a shaft of an element, such as finial 86 shown in FIGS. 26 and 27. While directional terms such as "bottom" are used for ease of reference with respect to the drawing figures, it is to be understood that the structures may be oriented otherwise. For example, it is evident in FIGS. 26 and 27 that finial 86 is attached to an aperture 286 located on a face of a connector that is oriented to face upward.

While the two cylindrical portions 186 of the illustrated three-way connector 196 are shown as being oriented substantially orthogonally with respect to each other, it is contemplated that other configurations for a connector based on the teachings of the illustrated three-way connector 198 and four-way connector 124 can be devised by having different numbers of cylindrical portions 186 at different orientations relative to cube portion 184, as desired for a particular connection joint. Moreover, while projection portions 186 are illustrated as being cylindrical, they may have other shapes and configurations that allow for insertion into ends of the tubular frame members.

Thus, while particular embodiments of connectors are illustrated, it is to be understood that many variations may be made in the number of projecting portions 186, the shapes of the projecting portions (which need not be cylindrical), the placement and orientation of bores in the connectors, the orientations of the projecting portions relative to the cube portion, and the lengths of the projecting portions, for example. Moreover, the connectors may be used for the attachment of not only the described tubes and elements, but if any of a variety of other parts and accessories, including the described finials. Moreover, while the disclosure describes modular livestock stalls, the teachings herein can also be applied to other modular enclosures, such as cubicles and pens, for example.

FIGS. 42-55 show a second exemplary embodiment of a vent element 82a and a second exemplary embodiment of a wall board 78a. All descriptions of a part also apply to other embodiments of that part, which are similarly numbered, unless otherwise specified. For example, all descriptions of vent element 82 also apply to vent element 82a unless otherwise specified; all descriptions of wall board 78 also apply to wall board 78a unless otherwise specified, etc.

Figure 42:
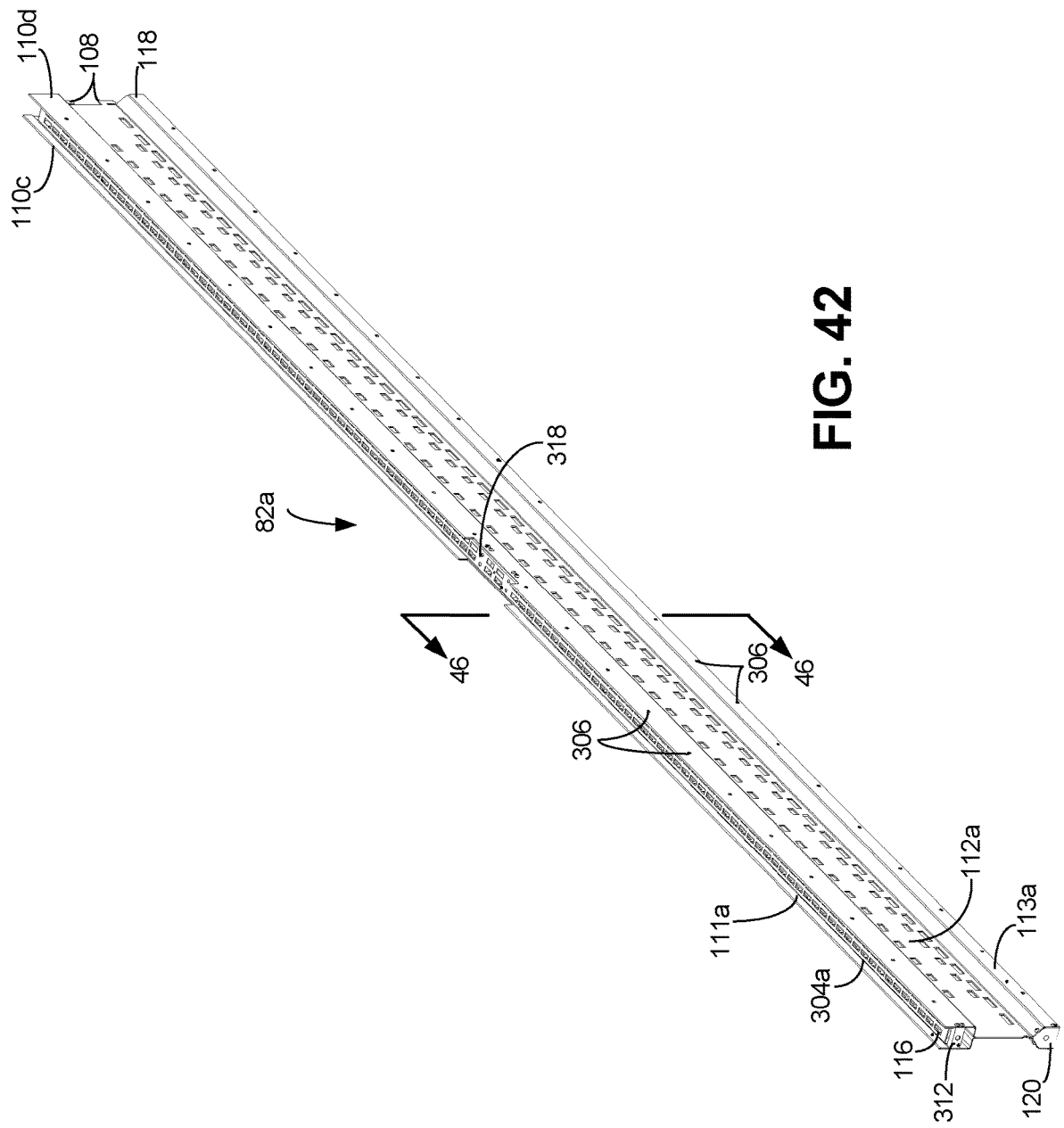
FIG. 42 is a perspective view of a second exemplary embodiment of a vent element.
Figure 43:
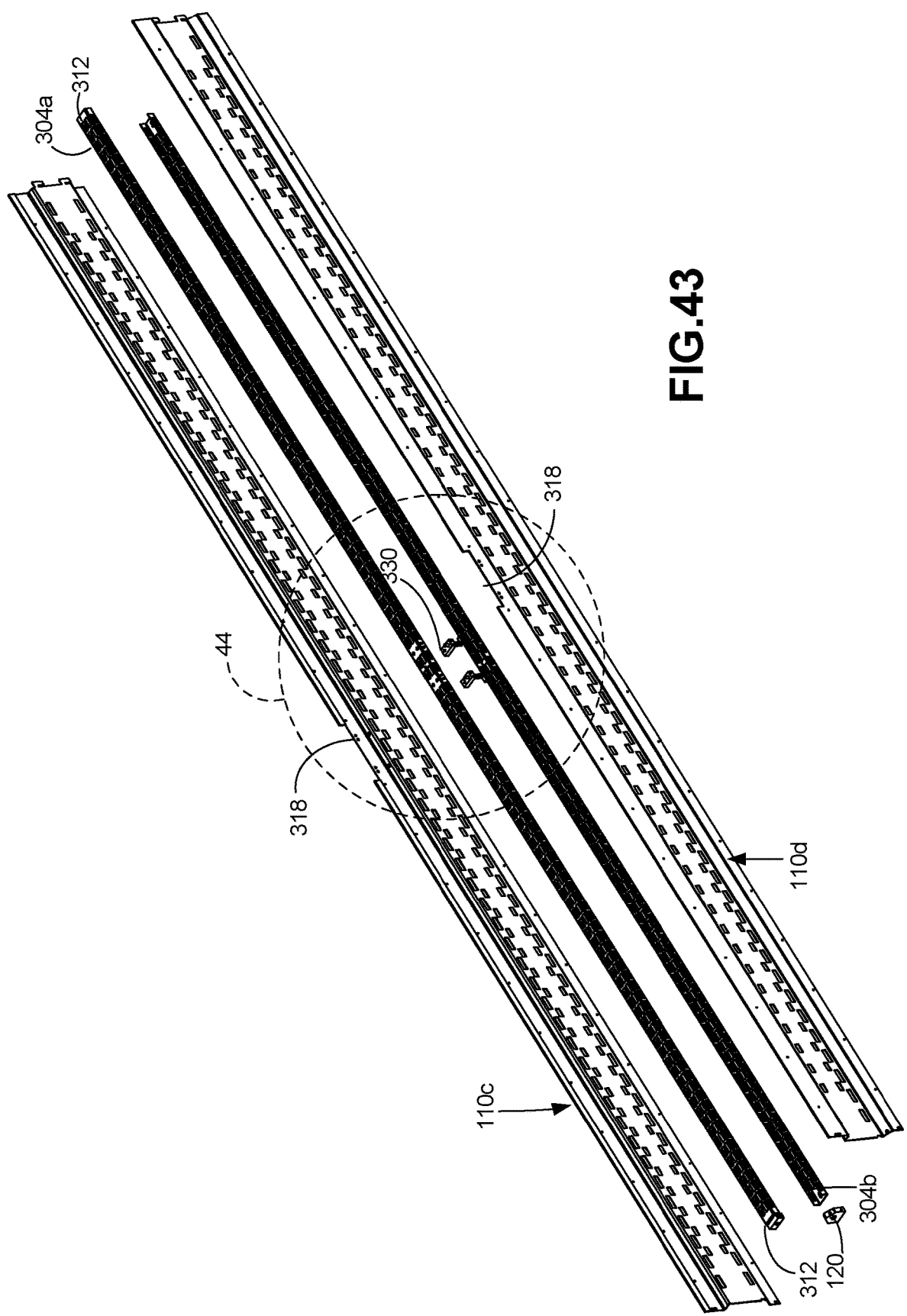
FIG. 43 is an exploded perspective view of the second exemplary embodiment of a vent element.
Figure 44:
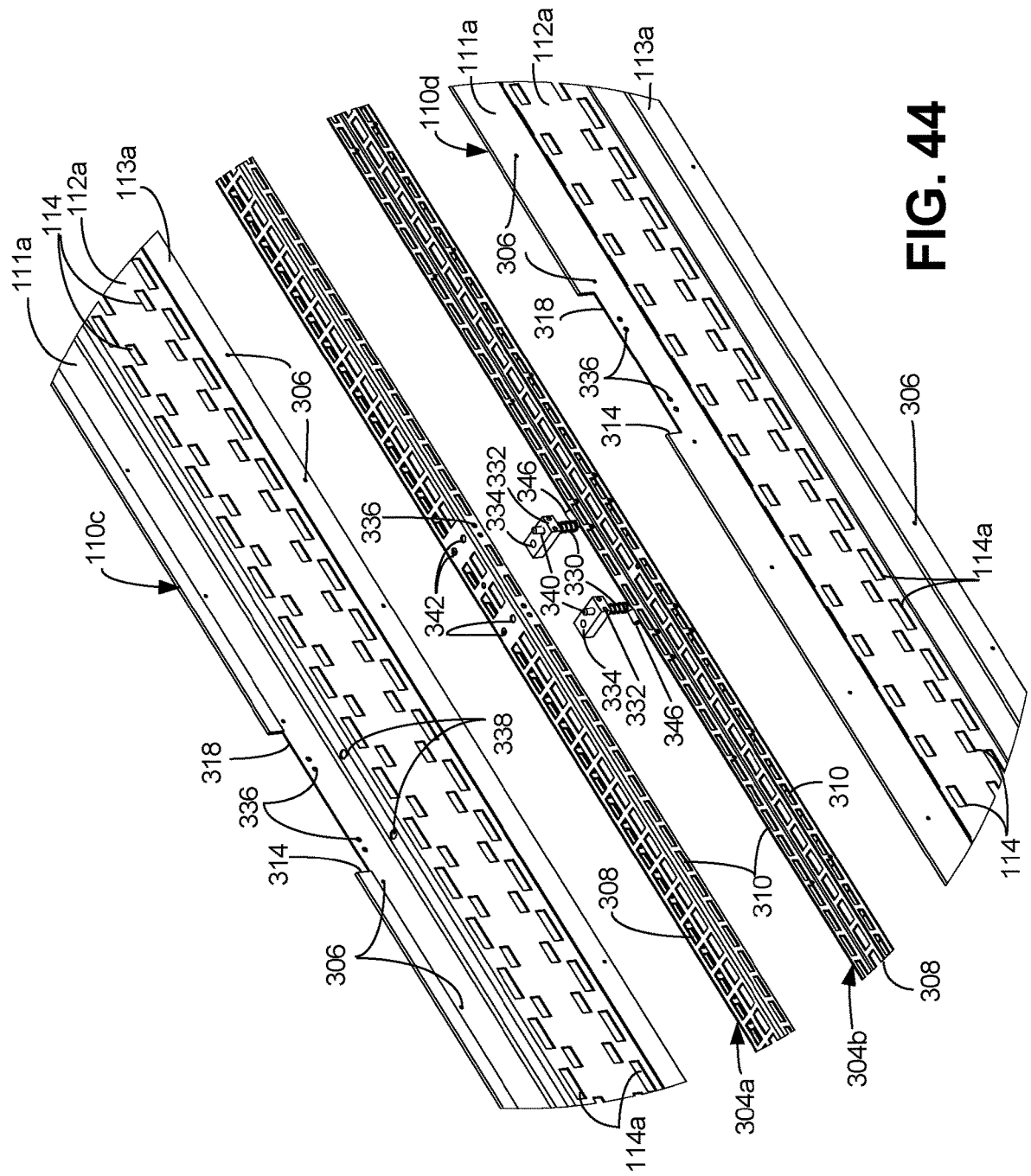
FIG. 44 is an enlarged view of the central encircled portion of FIG. 43 labeled "44."
Figure 46:
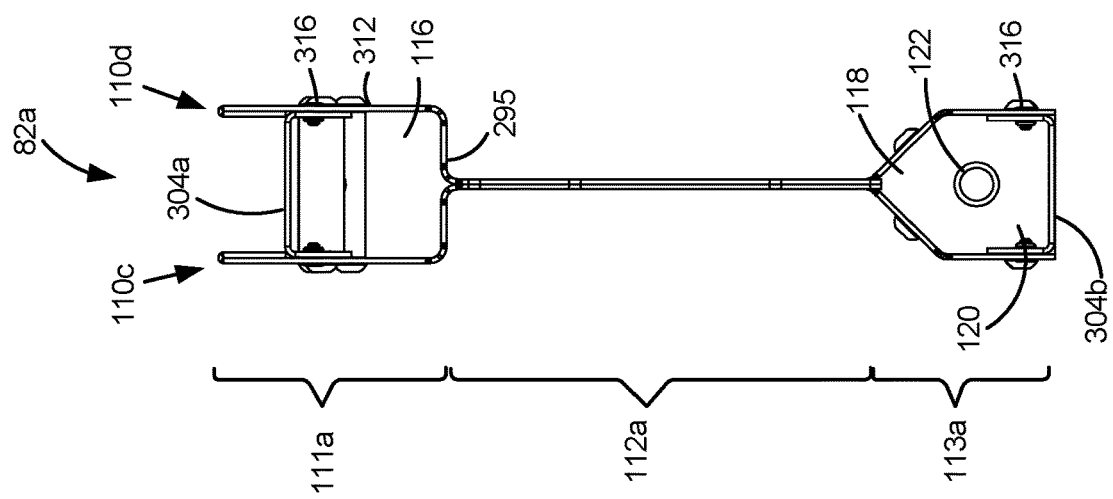
FIG. 46 is a cross-sectional elevation view of the vent element, taken at line 46-46 of FIG. 42.
Figure 45:
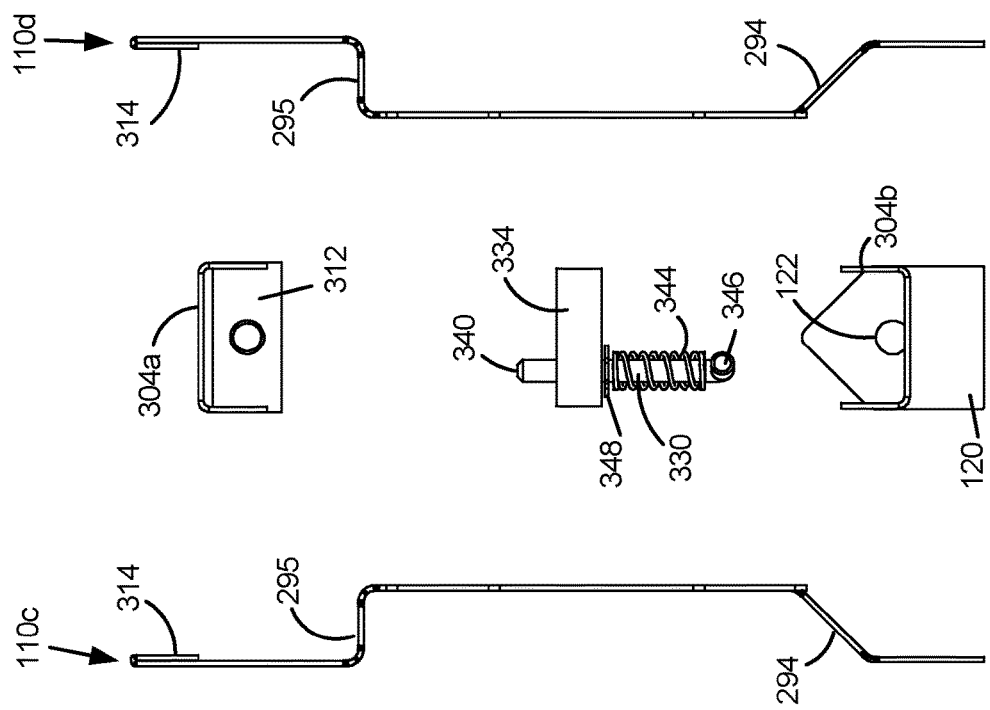
FIG. 45 is an end elevation view of the components of FIG. 43.

FIG. 42 is a perspective view of an exemplary vent element 82a. FIG. 43 is an exploded perspective view of the second exemplary embodiment of a vent element 82a. FIG. 44 is an enlarged view of the central encircled portion of FIG. 43 labeled "44." FIG. 45 is an end elevation view of the components of FIG. 43 (though bottom box beam 304b is shown higher relative to end wall 120 than it would be in actual use). FIG. 46 is a cross-sectional elevation view of the vent element, taken at line 46-46 of FIG. 42.

In an exemplary embodiment, vent element 82a is formed from two bent and stamped sheet pieces 110c and 110d that are formed, such as from stainless steel, as mirror images of each other. Each of pieces 110c, 110d includes upper portion 111a, middle portion 112a, and lower portion 113a. Pieces 110c, 110d are secured together at middle portion 112a. Each sheet metal piece 110c, 110d includes apertures 114, 114a through middle portion 112a to allow for air flow through vent element 82a, thereby providing a perforated panel at middle portion 112a. In an exemplary embodiment, a combined area of the plurality of apertures 114, 114a includes at least about 25% of an area of the middle portion 112a, up to about 50% of an area of the middle portion 112a. It is contemplated that other ranges are also possible, taking into consideration strength properties of the materials and construction of vent element 82a. In an exemplary embodiment, as shown most clearly in FIG. 44, larger apertures 114a are located near the top and bottom of middle portion 112a, while smaller apertures 114 are provided closer to a central area of middle portion 112a. No apertures are located in the center of middle portion 112a. This configuration provides for the most airflow through areas of middle portion 112a that are least likely to be contacted by an animal near the vent element 82a, as the top and bottom of middle portion 112a are somewhat shielded from likely direct contact by the jutting upper and lower portions 111a, 113a, respectively. The center of middle portion 112a, which is most likely to experience animal contact, is smooth to protect the animals from potential cuts from rubbing against the openings of apertures 114, 114a.

Figure 52:
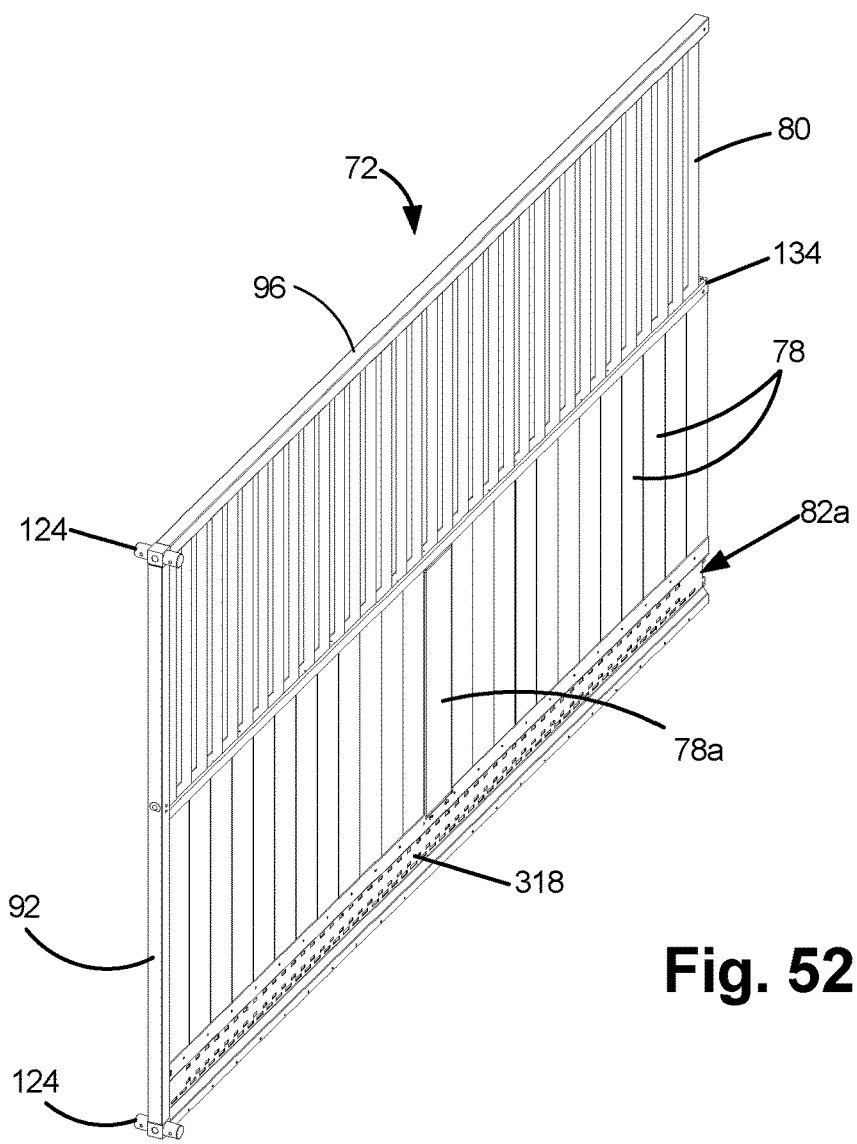
FIG. 52 is a perspective view of a wall assembly including the vent element of FIG. 42.

In an exemplary embodiment, the two sheet metal pieces 110c, 110d are attached together at middle portion 112a by lamination, including the use of adhesive and pressure. It is contemplated that other attachment methods can also or alternatively be used, such as the use of mechanical fasteners and welding, for example. An exemplary vent element 82a includes an open upper channel 116 formed by upper portions 111a of pieces 110c, 110d and an open lower channel 118 formed by lower portions 113 of pieces 110a, 110b. Upper channel 116 is configured to accept boards 78, 78a as shown in FIGS. 3, 8, 47, 48, 50 and 52. Upper portions 111a include a laterally extending channel floors 295. Lower portions 113a include angled side walls 294 (i.e., angled from middle portions 112a) to allow fluid and debris to flow or fall off by gravity. In an exemplary embodiment, an end of lower channel 118 is closed by end wall 120, which is welded into channel lower 118 and includes an aperture 122. As shown in FIGS. 46 and 52, aperture 122 of end wall 120 is provided to accept a fastener for attachment to a connector 124, which is also attached to front upright support 92.

In an exemplary embodiment, each of upper channel 116 and lower channel 118 includes an elongated top box beam 304a or bottom box beam 304b, respectively, attached to upper portions 111a and lower portions 113a by fasteners 316 such as screws or rivets through apertures 306. In exemplary embodiments, each of top box beam 304a and bottom box beam 304b is an elongated beam having at least three sides, including a lateral wall 308 and two vertical walls 310. As shown in FIGS. 44-47, in an exemplary assembly of vent element 82a, top box beam 304a is positioned in upper channel 116 with the lateral wall 308 at the top of the box beam 304a, so that an open channel faces downward. In an exemplary assembly of vent element 82a, bottom box beam 304b is positioned in lower channel 118 with lateral wall 308 at the bottom of the box beam 304b, so that an open channel faces upward. Lateral wall 308 of bottom box beam 304b is configured to rest on a clay or dirt ground surface and thereby support the structure of wall 72, even on an uneven support surface, as shown in FIG. 52. In an exemplary assembly, each box beam 304a, b is formed of a bent, perforated sheet of metal such as 16 gauge stainless steel. Providing the box beams 304 a, b within the channels 116, 118 lends strength and rigidity to the vent element 82a with little additional weight. In an exemplary embodiment, vent element 82a weighs about 60 pounds, thereby allowing for manipulation by a single person. In an exemplary embodiment, an end of top box beam 304a is closed by end wall 312, which is welded thereto.

As shown in FIGS. 44 and 45, each of sheet metal pieces 110c, 110d has a folded-over top edge hem 314 that adds strength to the structure and also presents a smooth rather than sharp top edge of the vent element 82a to workers and animals. As shown in FIG. 46, vent element 82a is formed by laminating or otherwise attaching sheet metals pieces 110c, 110d together at their middle portions 112a. Top box beam 304a is inserted into upper channel 116 and fixed therein by fasteners 316 inserted through apertures 306 in sheet metal piece 110c and corresponding apertures in lateral walls 310. Bottom box beam 304b is inserted into lower channel 118 and fixed therein by fasteners 316 inserted through apertures 306 in sheet metal piece 110d and corresponding apertures in lateral walls 310.

FIG. 47 shows a bottom portion of the wall 72 of FIG. 48 in cross section at central opening 318. As shown in FIGS. 42-44 and 52, vent element 82a includes a central cut-out or opening 318 in top channel 16 that is sized to permit lateral insertion of a wall board 78, 78a. In an exemplary embodiment, the opening is positioned near a center of the length of the elongated vent 82a. Thus, rather than requiring disassembly of front upright support 92 to allow for the removal and replacement of individual wall boards (such as when some wall boards 78, 78a are damaged and others are not), a user can easily remove a central wall board 78, 78a at opening 318 and slide any boards 78, 78a in and out for repair and/or replacement. A top of the wall board 78, 78a is received in side wall channel 134 as explained above. To prevent the bottom of the central wall board 78a from falling out of opening 318, a special configuration of central wall board 78a is shown in FIGS. 53-55. While opening 318 is described as a "central" opening, which allows for convenient removal of any wall board 78 while traversing at most half a length of the wall 72, it is understood that such an opening could alternatively be provided closer to one of the ends of vent element 82a. Moreover, more than one such opening could be provided; for example, two lateral openings 318 could be provided on channel 16, each approximately one-third of the distance from an end.

In an exemplary embodiment, rather than using a typical wood wall board 78 at the central opening 318, a central wall board 78a is formed as a hollow metal or polymer box sleeve 320 with end plates 322 at each end thereof, as shown in FIGS. 53-55. As shown in FIG. 54, sleeve 320 is formed by attaching sides 350 and 352 at flanges 354, such as by welding. When assembled, the attached flanges 354 form tongue and groove structures 324. In an exemplary embodiment, each side 350, 352 is formed from carbon steel, painted steel, or stainless steel. Each end plate 322 includes a plurality of locking holes 326 and optionally another hole 328 for material and weight savings. Support plates 356 are attached to the interior of sleeve 320 with fasteners 358 through aligned apertures 360, 362. End plates 322 are attached to support plates with vertical fasteners (such as bolt 366 in FIG. 48) through aligned apertures. As shown in FIG. 54, at the top of central wall board 78a, a top cap 364 is attached to the top end plate 322, such as with vertical fasteners, such as bolts (not shown) through aligned apertures. The top cap is configured to be received in side wall channel 134, just as the tops of wall panels 78 are received therein.

Please refer to FIGS. 44-51b for an explanation of installation of the locking shaft assembly. In FIGS. 51a and 52b, only portions of piece 110c are shown. The locking shaft 330 is inserted upward through aperture 338 in floor 296 of upper channel 116 of piece 110c. From the top, a washer 368 is placed around locking shaft 330. Compression spring 334 is inserted above washer 368. Snap ring 348 is clipped onto groove 370 of lock block 334. A suitable snap ring is commercially available from McMaster-Carr of Elmhurst, Ill., as "Wide-Grip Side-Mount External Retaining Ring 15-7 PH Stainless Steel, for ¼" OD." Tip 340 of locking shaft 330 is inserted into one of receiving holes 372 in lock block 334. Because two such holes 372 are provided, the locking shaft 330 can be inserted into either one and could be used in both but need not be used in both. Lock blocks 334 are connected to top box beam 304a and upper portion 111a of pieces 110c, 110d by fasteners through aligned apertures 332 in lock blocks 334 and apertures 336 in pieces 110c, 110d and top box beam 304a.

Figure 50:
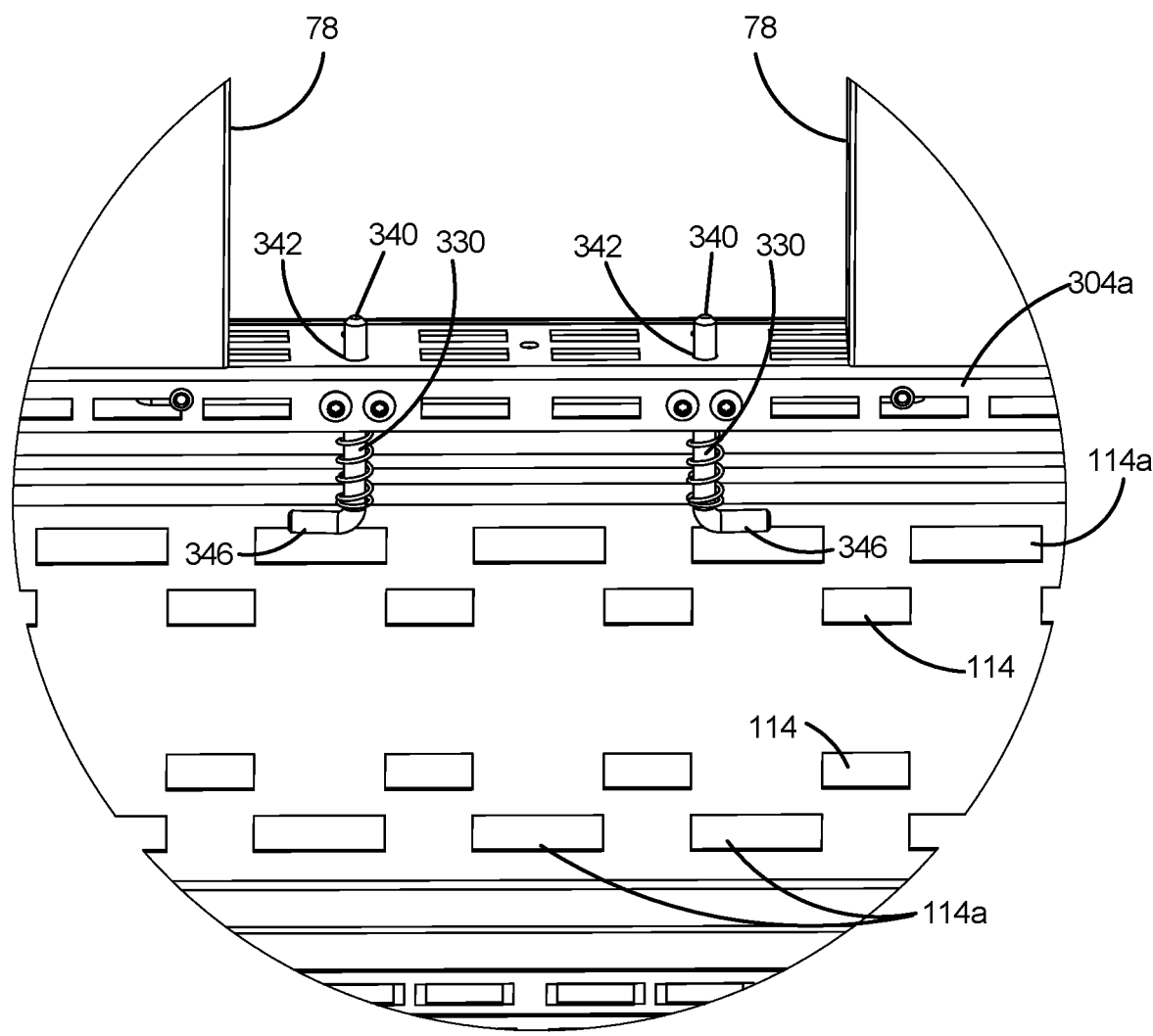
FIG. 50 is an enlarged side perspective view of the vent element around the central channel opening.
Figure 51A:
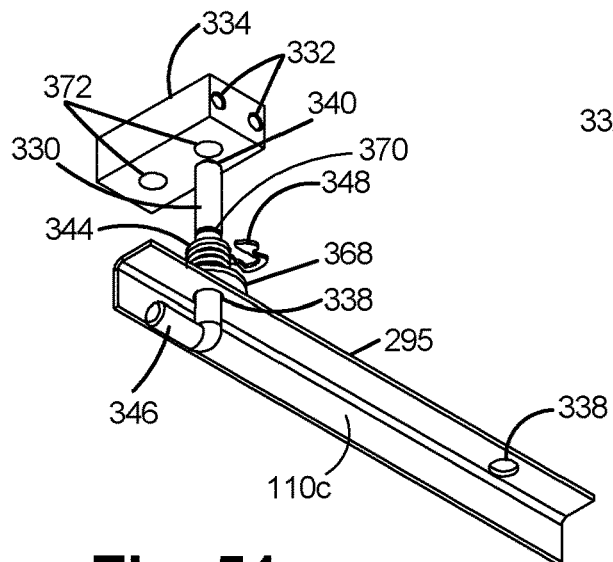
FIG. 51*a* is an exploded perspective view of components of an exemplary locking shaft assembly, shown from below.
Figure 51B:
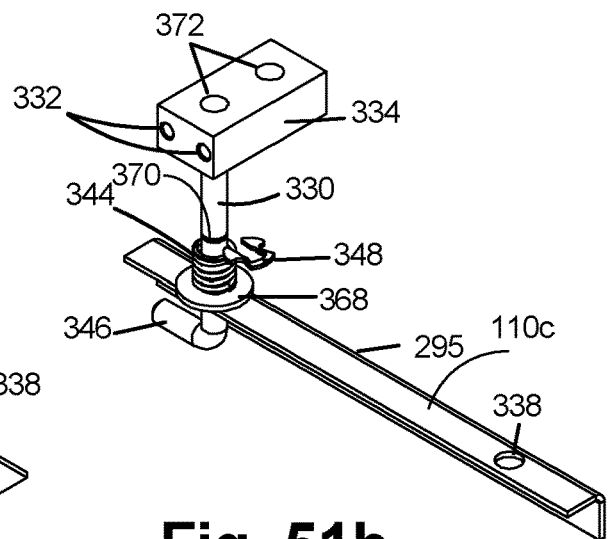
FIG. 51*b* is an exploded perspective view of components of the locking shaft assembly, shown from above.

In FIG. 50, a side wall of the upper channel is removed so that the locking shaft assembly is visible. At what would be the opening 318 in channel 116 between typical wall boards 78, a space for central wall board 78a is maintained. As visible in FIG. 50, tip 340 of each locking shaft 330 protrudes above top box beam 304a for retention in aperture 326 of end plate 322 of wall board 78a. The upper tip 340 of the locking shaft extends through holes 342 in lateral wall 308 of upper box beam 304a and through locking hole 326 of end plate 322 of central wall board 78a, to thereby lock the bottom of central wall board 78a to the upper channel 16 and top box beam 304a. The locking shaft is biased into the locked position by spring 344. However, the upper tip 340 of the locking shaft 330 is easily released from end plate 322. As shown in FIG. 49, a user may release a wall board 78a so retained by pulling downward on hook 346 of locking shaft 330, to compress spring 344 between snap ring 348 and floor 295. This allows tip 340 to be pulled down below aperture 342 of top box beam 304a, so that tip 340 is released from wall board 78a. Thus released, central wall board 78a is easily removed from channel 16, and other wall boards 78 can be slid to opening 318 for removal as desired.

An advantage of providing central opening 318 in vent element 82a is evident by looking back at FIG. 8. In that assembly method, spindles 80 and wall boards 78 are inserted between side wall channel 134 and vent channel 82 to form wall 72 of FIG. 13 before front upright support 92 of FIG. 15 is added. However, by using vent element 82a, the skeletal framework of an entire wall, including vent element 82a, rear upright support 90, front upright support 92, side wall channel 134 and top side wall tube 96 can be assembled initially with appropriate connectors such as connector 124, thereby eliminating the need for a temporary support stand 158 as shown in FIG. 8. Thereafter, the spindles 80 can be installed as described above. Each wall board 78 can be inserted between side wall channel 134 and vent element 82a at opening 318 and slid forward or backward into position. A final central wall board 78a is inserted at opening 318 and locked in place by locking shafts 330. Any of the wall boards and/or spindles can be easily removed for repair or replacement by using the quick-release feature of the locking shafts 330 without requiring disassembly of the skeletal wall support structures. Moreover such actions may be accomplished easily by a single person and without the use of any tools.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. While examples are specifically directed to use for a livestock stall, it is specifically contemplated that the described elements can also be used for other modular constructions, such as modular office installations. Thus, any livestock intended uses are just exemplary and not limiting.

The invention claimed is:

1. An elongated vent including:
   a first piece having a first upper portion, a first middle portion and a first lower portion; and a second piece that is a mirror image of the first piece, the second piece having a second upper portion, a second middle portion and a second lower portion;

wherein the first and second pieces are joined together at their respective first and second middle portions, wherein each of the first and second middle portions includes a plurality of apertures therethrough, to form a perforated panel;

wherein the first and second upper portions form a first channel; and wherein the first and second lower portions form a second channel.

2. The vent of claim 1 further including a hook located on the perforated panel.

3. The vent of claim 1 further including a wall attached to the first and second lower portions at an end of the second channel.

4. The vent of claim 3 wherein the wall includes a hole therethrough.

5. The vent of claim 1 wherein at least a part of the first lower portion extends at an angle from the first middle portion.

6. The vent of claim 1 wherein a combined area of the plurality of apertures includes at least 25% of an area of the perforated panel.

7. The vent of claim 1 wherein the first channel includes a lateral opening in a central portion thereof.

8. The vent of claim 1 comprising a box beam disposed in at least one of the first channel or second channel.

9. The vent of claim 8 wherein the box beam comprises a lateral wall between two vertical walls.

10. The vent of claim 8 wherein the box beam comprises a plurality of apertures therethrough.

11. The vent of claim 8 wherein the box beam is disposed in the second channel and is configured to rest on a floor.

12. The vent of claim 8 wherein the box beam is disposed in the first channel, the vent comprising a locking shaft configured for attachment to the box beam.

13. The vent of claim 12 wherein the locking shaft comprises a spring.

14. The vent of claim 12 wherein a portion of the locking shaft extends outside the first channel.

15. A system comprising the vent of claim 1 and a wall board, wherein a portion of the wall board is configured for insertion into the first channel.

16. The system of claim 15 wherein the wall board includes an end plate having a locking hole.

17. The system of claim 16, wherein the vent includes a locking shaft having a tip configured to engage the locking hole.

18. The system of claim 15 wherein the wall board is hollow.

* * * * *